United States Patent
Cruz

(10) Patent No.: US 8,756,040 B2
(45) Date of Patent: *Jun. 17, 2014

(54) COMPUTATIONAL FLUID DYNAMICS MODELING OF A BOUNDED DOMAIN

(75) Inventor: Ethan E. Cruz, Lagrangeville, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/451,700

(22) Filed: Apr. 20, 2012

(65) Prior Publication Data

US 2012/0303339 A1   Nov. 29, 2012

Related U.S. Application Data

(63) Continuation of application No. 13/117,358, filed on May 27, 2011.

(51) Int. Cl.
| | | |
|---|---|---|
| *G06F 17/50* | (2006.01) | |
| *G06F 7/60* | (2006.01) | |
| *G06G 7/48* | (2006.01) | |
| *G06G 7/50* | (2006.01) | |
| *G06F 13/10* | (2006.01) | |
| *G06F 11/26* | (2006.01) | |

(52) U.S. Cl.
CPC ............ *G06F 13/105* (2013.01); *G06F 11/261* (2013.01); *G06F 17/50* (2013.01)
USPC .......................... 703/2; 703/1; 703/6; 703/9

(58) Field of Classification Search
None
See application file for complete search history.

(56) References Cited

U.S. PATENT DOCUMENTS

| | | | |
|---|---|---|---|
| 5,544,524 A * | 8/1996 | Huyer et al. .................... 73/147 |
| 5,581,478 A * | 12/1996 | Cruse et al. .................. 700/276 |
| 6,134,511 A * | 10/2000 | Subbarao .......................... 703/6 |
| 6,574,104 B2 * | 6/2003 | Patel et al. .................... 361/695 |
| 6,651,037 B1 | 11/2003 | Hall et al. |
| 6,718,277 B2 * | 4/2004 | Sharma ......................... 702/132 |
| 7,031,870 B2 * | 4/2006 | Sharma et al. ................ 702/130 |
| 7,092,845 B2 | 8/2006 | Keane et al. |
| 7,124,038 B2 * | 10/2006 | van Dam et al. ................. 702/50 |
| 7,239,990 B2 * | 7/2007 | Struijs ................................ 703/2 |
| 7,251,592 B1 * | 7/2007 | Praisner et al. .................... 703/9 |

(Continued)

OTHER PUBLICATIONS

Coenen et al. "Quasi-Simultaneous Vicous-Inviscid Interaction for Three-Dimensional Turbulent Wing Flow", ICAS 2000 Congress.*

(Continued)

*Primary Examiner* — Shambhavi Patel
(74) *Attorney, Agent, or Firm* — Dennis Jung, Esq.; Kevin P. Radigan, Esq.; Heslin Rothenberg Farley & Mesiti P.C.

(57) ABSTRACT

A method for hybrid computational fluid dynamics (CFD) approach for modeling a bounded domain, such as a data center, is disclosed. The CFD modeling approach divides the bounded domain into one or more viscous regions and one or more inviscid regions, and then performs a viscous domain solve for the viscous region(s) using a computational fluid dynamics model with turbulence equations (i.e., a turbulence model), and performs inviscid domain solve for the inviscid region(s) using a set of inviscid equations (or potential flow equations). After solving for the different regions, results of the viscous domain solve and the inviscid domain solve are provided as a model of the bounded domain.

20 Claims, 19 Drawing Sheets

(56) References Cited

U.S. PATENT DOCUMENTS

| | | | |
|---|---|---|---|
| 7,359,841 B1 | 4/2008 | Hixon | |
| 7,430,500 B2* | 9/2008 | Lei et al. | 703/9 |
| 7,543,544 B2* | 6/2009 | Yap | 114/273 |
| 7,565,276 B2* | 7/2009 | Song et al. | 703/2 |
| 2,596,476 A1 | 9/2009 | Rasmussen et al. | |
| 7,596,476 B2* | 9/2009 | Rasmussen et al. | 703/2 |
| 7,644,051 B1* | 1/2010 | Moore et al. | 706/21 |
| 7,765,072 B2* | 7/2010 | Eiler et al. | 702/31 |
| 7,881,910 B2* | 2/2011 | Rasmussen et al. | 703/1 |
| 7,885,795 B2* | 2/2011 | Rasmussen et al. | 703/5 |
| 7,921,002 B2* | 4/2011 | Kamatsuchi | 703/9 |
| 8,306,794 B2* | 11/2012 | Hamann et al. | 703/5 |
| 8,315,841 B2* | 11/2012 | Rasmussen et al. | 703/1 |
| 8,457,939 B2* | 6/2013 | Rodriguez et al. | 703/9 |
| 2004/0167757 A1* | 8/2004 | Struijs | 703/2 |
| 2005/0267639 A1 | 12/2005 | Sharma et al. | |
| 2007/0034746 A1* | 2/2007 | Shmilovich et al. | 244/207 |
| 2007/0038414 A1* | 2/2007 | Rasmussen et al. | 703/1 |
| 2007/0078635 A1* | 4/2007 | Rasmussen et al. | 703/1 |
| 2007/0174024 A1* | 7/2007 | Rasmussen et al. | 703/1 |
| 2007/0219766 A1* | 9/2007 | Duggleby et al. | 703/9 |
| 2008/0275677 A1 | 11/2008 | Landon | |
| 2009/0138313 A1* | 5/2009 | Morgan et al. | 705/8 |
| 2009/0150123 A1* | 6/2009 | Archibald et al. | 703/1 |
| 2009/0171596 A1* | 7/2009 | Houston | 702/45 |
| 2009/0234595 A1* | 9/2009 | Okcay et al. | 702/49 |
| 2009/0312990 A1* | 12/2009 | Fouce et al. | 703/2 |
| 2009/0326879 A1 | 12/2009 | Hamann et al. | |
| 2009/0326884 A1 | 12/2009 | Amemiya et al. | |
| 2010/0036614 A1 | 2/2010 | Zuercher | |
| 2010/0131109 A1 | 5/2010 | Rasmussen et al. | |
| 2010/0280802 A1* | 11/2010 | Calmels | 703/2 |
| 2011/0040532 A1 | 2/2011 | Hamann et al. | |
| 2011/0246147 A1* | 10/2011 | Rasmussen et al. | 703/2 |
| 2012/0072181 A1* | 3/2012 | Imani | 703/1 |
| 2012/0303344 A1 | 11/2012 | Cruz | |

OTHER PUBLICATIONS

Rodrigues et al. "Modelling Natural Convection in a Heated Vertical Channel for Room Ventilation", Building and Environment 35 (2000) 455-469.*

Pierce et al. "Preconditioned Multigrid Methods for Compressible Flow Calculations on Stretched Meshes", Journal of Computational Physics 136, 425-445 (1997).*

Chen et al. "Simplified Method for Indoor Airflow Simulation", 2000.*

Chorel et al. "Toward Quantitative CFD Prediction of Contaminant Particle Deposition against Surfaces in Large Forced-Ventilation Food Plants", Oct. 2011.*

Harris, Andrew. "Reducing Energy Demand in Commercial Buildings: Balancing Convection and Radiant Cooling", 2009.* da Silva et al. "Optimal geometry of L and C-shaped channels for maximum heat transfer rate in natural convection", International Journal of Heat and Mass Transfer 48 (2005) 609-620.*

John et al. "Derivation and Analysis of Near Wall Models for Channel and Recirculating Flows", Computers and Mathematics with Applications 48 (2004) 1135-1151.*

Griffith B. and Chen, Q. 2003. "A momentum-zonal model for predicting zone airflow and temperature distributions to enhance building load and energy simulations," HVAC&R Research, 9(3), 309-325.*

Kaiser et al. "Numerical correlation for natural convective flows in isothermal heated, inclined and convergent channels, for high Rayleigh numbers", Computers & Fluids 38 (2009) 1-15.*

Oh, Hyoung Woo. "Computational Fluid Dynamics", 2010.*

Pepper, et al. "Modeling Indoor Air Pollution", 2009.*

Lucas et al. "Improved Hydrosolar Roof for buildings' air conditioning", Energy and Buildings 35 (2003) 963-970.*

Knopp et al. "Iterative Substructuring Methods for Indoor Air Flow Simulation", 2005.*

Linden, P.F. "The Fluid Mechanics of Natural Ventilation", Annu. Rev. Fluid Mech. 1999. 31:201-38.*

Norton et al. "Applications of computational fluid dynamics (CFD) in the modelling and design of ventilation systems in the agricultural industry: A review", Bioresource Technology 98 (2007) 2386-2414.*

Kuznik et al. "Experimental and numerical study of a full scale ventilated enclosure: Comparison of four two equations closure turbulence models", Building and Environment 42 (2007) 1043-1053.*

Lee et al. "Effect of Interior Partitions on the Air Movement and Air Quality in a Room With Mixing Ventilation", 2000.*

Peri et al. "Numerical Simulation of Air Flow in a General Ward of a Hospital", Sep. 2011.*

Posner et al. "Measurement and Prediction of Indoor Air Flow in a Model Room", 2003.*

Sinha et al. "Numerical simulation of two-dimensional room air flow with and without buoyancy", Energy and Buildings 32 _2000. 121-129.*

Stamou et al. "Verification of a CFD model for indoor airflow and heat transfer", Building and Environment 41 (2006) 1171-1181.*

Sun et al. "Air flow characteristics of a room with square cone diffusers", Building and Environment 40 (2005) 589-600.* van Treek et al. "Direct Building Energy Simulation Based on Large Eddy Techniques and Lattice Boltzmann Methods", 2001.*

Wang et al. "Application of CFD in retrofitting air-conditioning systems in industrial buildings", Energy and Buildings 35 (2003) 893-902.*

Xu et al. "A Two-Layer Turbulence Model for Simulating Indoor Airflow: Part I—Model Development", 2001.*

Xi et al. "A Two-Layer Turbulence Model for Simulating Indoor Airflow: Part II—Applications", 2001.*

Zhao et al. "Comparison of indoor aerosol particle concentration and deposition in di#erent ventilated rooms by numerical method", Building and Environment 39 (2004) 1-8.*

Zuo, W., Hu, J., and Chen, Q. 2010. "Improvements on FFD modeling by using different numerical schemes," Numerical Heat Transfer, Part B: Fundamentals, 58(1), 1-16.*

Zuo, W. and Chen, Q. 2010. "Fast and informative flow simulations in a building by using fast fluid dynamics model on graphics processing unit," Building and Environment, 45(3), 747-757.*

Zuo, W. and Chen, Q. 2009. "Real time or faster-than-real-time simulation of airflow in buildings," Indoor Air, 19(1), 33-44.*

Zhai, Z., Zhang, Z., Zhang, W., and Chen, Q. 2007. "Evaluation of various turbulence models in predicting airflow and turbulence in enclosed environments by CFD: Part-1: summary of prevent turbulence models," HVAC&R Research, 13(6).*

Zhang, Z., Zhang, W., Zhai, Z., and Chen, Q. 2007. "Evaluation of various turbulence models in predicting airflow and turbulence in enclosed environments by CFD: Part-2: comparison with experimental data from literature," HVAC&R Research, 13(6).*

Oliger et al., "Theoretical and Practical Aspects of Some Initial-Boundary Value Problems in Fluid Dynamics", IBM Technical Disclosure Bulletin, IPCOM000128294D (Sep. 15, 2005).

Mavriplis, D., "Accurate Multigrid Solution of the Euler Equations on Unstructured and Adaptive Meshes", IBM Technical Disclosure Bulletin, IPCOM000149411D (Apr. 13, 2007).

Pattison, J., "A Cut-Cell, Agglomerated-Multigrid Accelerated, Cartesian Mesh Method for Compressible and Incompressible Flow", Dissertation: Masters of Engineering, University of Pretoria, Department of Mechanical and Aeronatical Engineering (Aug. 2006).

Berezin et al., "Improvements to a Tightly Coupled Viscous-Inviscid Procedure for Three-Dimensional Unsteady Transonic Flow", Computers & Fluids, vol. 27, Nos. 5-6, pp. 689-694 (1998).

Cruz, E., Office Action for U.S. Appl. No. 13/117,358, filed May 27, 2011 (U.S. Patent Publication No. 2012/0303344 A1), dated Apr. 11, 2013 (17 pages).

Cruz, E., Final Office Action for U.S. Appl. No. 13/117,358, filed May 27, 2011 (U.S. Patent Publication No. 2012/0303344 A1), dated Sep. 24, 2013 (14 pages).

Ethan E. Cruz, Notice of Allowance of U.S. Appl. No. 13/117,358, filed May 27, 2011 (U.S. Patent Publication No. 2012/0303344 A1), dated Jan. 23, 2014 (15 pages).

(56) References Cited

OTHER PUBLICATIONS

Chen et al., "Simplified Method for Indoor Airflow Simulation", Proceedings of CLIMA 2000 World Congress, Burssels, Belgium, pp. 1-18 (2000).
Chorel et al., "Toward Quantative CFD Prediction of Contaminant Particle Deposition Against Surfaces in Large Forced-Ventilation Food Plants", Aerosol Science and Technology, vol. 44, pp. 10-28 (2010).
daSilva et al., "Optimal Geometry of L and C-Shaped Channels for Maximum Heat Transfer Rate in Natural Convection", International Journal of Heat and Mass Transfer 48, pp. 609-620 (2005).
Griffith et al., "A Momentum-Zonal Model for Predicting Zone Airflow and Temperature Distributions to Enhance Building Load and Energy Simulations", HVAC&R Research, vol. 9, No. 3, pp. 309-325 (2003).
Andrew Harris, "Reducing Energy Demand in Commercial Buildings: Balancing Convection and Radiant Cooling", Electronic Theses and Dissertations, Washington University, St. Louis, MO (USA), Paper 440 (2009).
John et al., "Derivation and Analysis of Near Wall Models for Channel and Recirculating Flows", An International Journal of Computers and Mathematics with Applications 48, pp. 1135-1151 (2004).
Kaiser et al., "Numerical Correlations for Natural Convective Flows in Isothermal Heated, Inclined and Convergent Channels, for High Rayleigh Numbers", Computers & Fluids 38, pp. 1-15 (2009).
Knopp et al., "Iterative Substructuring Methods for Indoor Air Flow Simulation", pp. 209-216 (2005).
Kuznik et al., "Experimental and Numerical Study of a Full Scale Ventilated Enclosure: Comparison of Four Two Equations Closure Turbulence Models", Building & Environment 42, pp. 1043-1053 (2007).
Lee et al., "Effect of Interior Partitions on the Air Movement and Air Quality in a Room with Mixing Ventilation", The University of Reading, Reading, UK (2000).
P.F. Linen, "The Fluid Mechanics of Natural Ventilation", Annual Rev. Fluid Mechanics, vol. 31, pp. 201-238 (1999).
Lucas et al, "Improved Hydrosolar Roof for Buildings' Air Conditioning", Energy and Buildings 35, pp. 963-970 (2003).
Norton et al., "Applications of Computational Fluid Dynamics (CFD) in the Modeling and Design of Ventilation Systems in the Agricultural Industry: A Review", Bioresource Technology 98, pp. 2386-2414 (2007).
Hyoung Woo Oh, "Computational Fluid Dynamics" (2010).
Pepper et al., "Modeling Indoor Air Pollution" (2009).
Peri et al., "Numerical Simulation of Air Flow in a General Ward of a Hospital", IJRRAS, vol. 8, No. 3, pp. 400-444 (2011).
Posner et al., "Measurement and Prediction of Indoor Air Flow in a Model Room", Energy and Buildings 35, pp. 515-526 (2003).
Sinha et al., "Numerical Simulation of Two-Dimensional Room Air Flow With and Without Buoyancy", Energy and Buildings 32, pp. 121-129 (2000).
Stamou et al., "Verification of a CFD Model for Indoor Airflow and Heat Transfer", Building and Environment 41, pp. 1171-1181 (2006).
Sun et al., "Air Flow Characteristics of a Room with Square Cone Diffusers", Building and Environment 30, pp. 589-600 (2005).
Wang et al, "Application of CFD in Retrofitting Air-Conditioning Systems in Industrial Buildings", Energy and Buildings 35, pp. 893-902 (2003).
Xu et al., "A Two-Layer Turbulence Model for Simulating Indoor Airflow—Part I. Model Development", Energy and Buildings 33, pp. 613-625 (2001).
Xu et al., "A Two-Layer Turbulence Model for Simulating Indoor Airflow—Part II. Applications", Energy and Buildings 33, pp. 627-639 (2001).
Zhai et al., "Evaluation of Various Turbulence Models in Predicting Airflow and Turbulence in Enclosed Environments by CFD: Part I: Summary of Prevalent Turbulence Models", HVAC&R Research, vol. 13, No. 6, pp. 1-21 (2007).
Zhang et al., "Evaluation of Various Turbulence Models in Predicting Airflow and Turbulence in Enclosed Environments by CFD: Part 2: Comparison with Experimental Data from Literature", HVAC&R Research, vol. 13, No. 6, pp. 1-18 (2007).
Zhao et al., "Comparison of Indoor Aerosol Particle Concentration and Deposition in Different Ventilated Rooms by Numerical Method", Building and Environment 39, pp. 1-8 (2004).
Zuo et al., "Real Time or Faster-Than-Real-Time Simulation of Airflow in Buildings", Indoor Air, vol. 19, No. 1, pp. 33-44 (2009).
Zuo et al., "Fast and Informative Flow Simulations in a Building by Using Fast Fluid", Building and Environment 45, pp. 747-757 (2010).
Zuo et al., "Improvements on FFD Modeling by Using Different Numerical Schemes", Numerical Heat Transfer, Part B: Fundamentals, vol. 58, No. 1, pp. 1-16 (2010).

* cited by examiner

COMPUTATIONAL FLUID DYNAMICS MODELING OF A BOUNDED DOMAIN

CROSS-REFERENCE TO RELATED APPLICATION

This application is a continuation of U.S. Ser. No. 13/117,358, entitled "COMPUTATIONAL FLUID DYNAMICS MODELING OF A BOUNDED DOMAIN," filed May 27, 2011, which is hereby incorporated herein by reference in its entirety.

BACKGROUND

The heat dissipated by today's computing equipment is reaching levels that make it challenging to cool the computing equipment in densely-packed data centers. In data centers, the computing equipment, such as a multitude of computer servers, are commonly placed in a series of racks arranged in one or more rows in the data center. Typically, the data center has a cooling system that includes, by way of example, one or more air-conditioning units. The one or more air-conditioning units provide cooled air to the electronics racks via, for example, a sub-floor or overhead plenum and associated perforated tiles or diffusers. Without a proper layout of the data center, costly inefficiencies in the cooling system inevitably occur, possibly resulting in insufficient cooling of the electronics racks.

Airflow distributions within the data center significantly impact the thermal environment of the equipment within the data center. Computational fluid dynamics (CFD) calculations have been used to solve the Navier-Stokes (NS) equations, and the modeling results of the NS-CFD have been employed to thermally manage data centers. There can be, however, several potential problems with NS-CFD modeling of a data center. For example, while NS-CFD modeling has been successfully deployed for the design of very well-defined structures, such as airplane wings, the application of NS-CFD modeling to data centers can be somewhat problematic. Every data center design is different. For example, heterogeneous technology (such as computer equipment from different vendors and/or of different versions) may be used within a given data center; available data (e.g., nameplate, power and flow data) may not reflect actual usage data; and, airflow is very difficult and time-consuming to accurately measure and characterize (and may not capture room effects, such as drafts).

Additionally, the NS-CFD calculations involved are time-consuming, and may take days in order to arrive at a reasonably accurate solution, using fine grids of the data center. Because of the time-consuming nature of existing NS-CFD models, their application in optimizing a data center layout, and cooling system for the data center, is limited.

BRIEF SUMMARY

The shortcomings of the prior art are overcome and additional advantages are provided through the provision of a method for computational fluid dynamics modeling of a bounded domain. The method includes: dividing the bounded domain into at least one viscous region and at least one inviscid region; performing viscous domain solve for the at least one viscous region using at least one turbulence model; performing inviscid domain solve for the at least one inviscid region using a set of inviscid equations; and providing results of the viscous domain solve and the inviscid domain solve as a model of the bounded domain.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Generally stated, disclosed herein are a method, computer system and program product for computational fluid dynamics modeling of a bounded domain. The modeling approach includes dividing the bounded domain into at least one viscous region and at least one inviscid region. Viscous domain solve is then performed for the at least one viscous region using a computational fluid dynamics model with turbulence equations (herein referred to as a "turbulence model"), and inviscid domain solve is performed for the one or more inviscid regions using a set of inviscid equations (alternatively referred to as potential flow equations). Upon convergence, the results of the viscous domain solve and the inviscid domain solve are assembled into a model of the bounded domain. In one particular example, the bounded domain being modeled is a data center.

Figure 1:
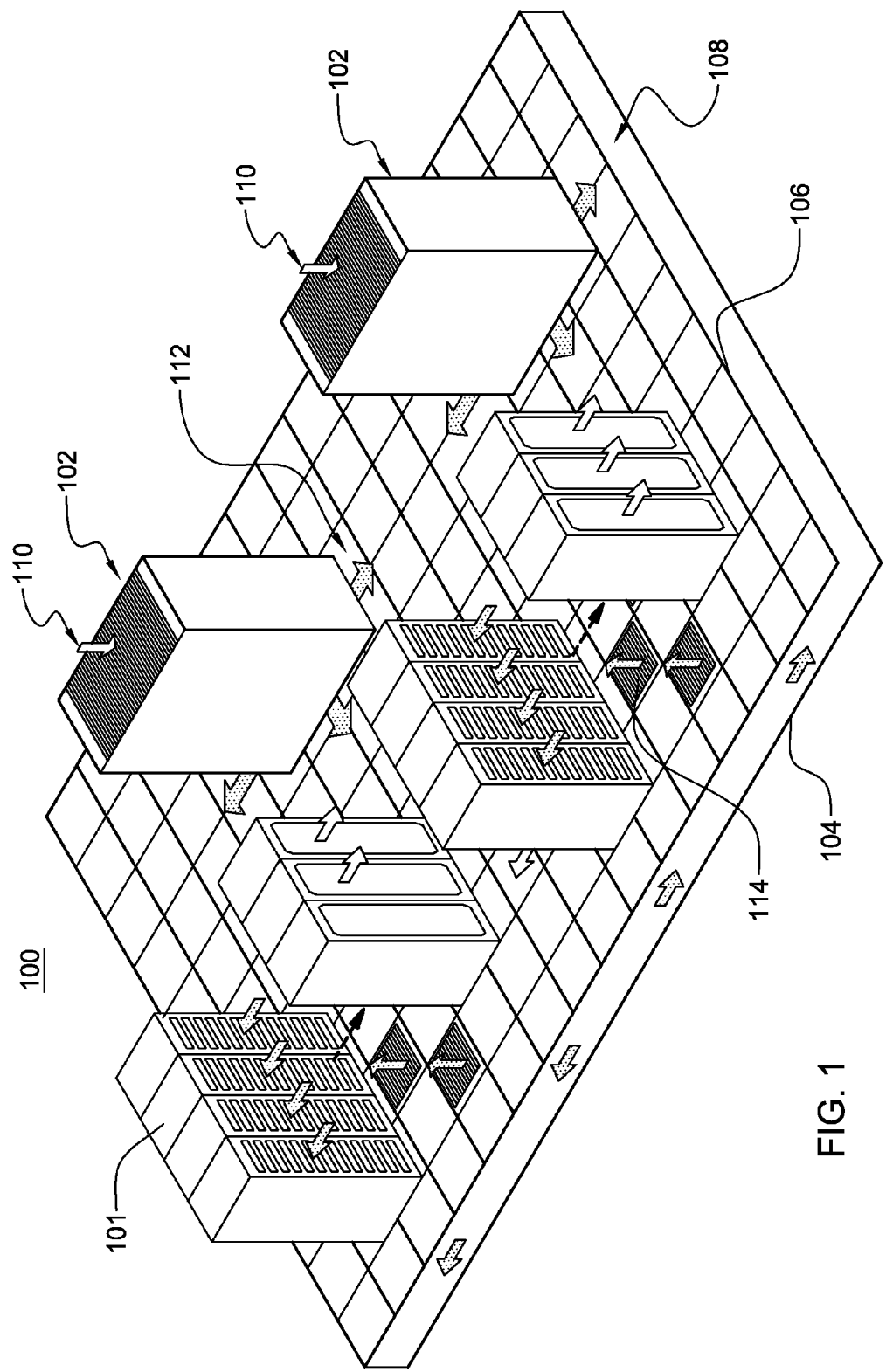
FIG. 1 depicts one example of a data center to be modeled using a computational fluid dynamics approach, in accordance with one or more aspects of the present invention.

FIG. 1 depicts one embodiment of a data center 100, which in the example depicted, is a raised floor layout of an air-cooled computer installation or data center 100. Data center 100 includes electronics (or information technology (IT)) racks 101 disposed in one or more rows on raised floor 106 of data center 100. One or more air-conditioning units 102 (also referred to as computer room air-conditioners (CRACs)) take in hot air (for example, through one or more air inlet vents in the top of the CRACs) and exhaust cooled air into a sub-floor plenum 108 below raised floor 106. Hot airflow through data center 100 is depicted by light arrows 110, and cooled airflow through data center 100 is indicated by stippled arrows 112.

In FIG. 1, electronics racks 101 employ a front-to-back cooling approach. Namely, according to this approach, cooled air is drawn in through a front (air inlet side) of each rack, and hot air is exhausted from a back (air outlet side) of each rack. The cooled air drawn into the front of the rack is supplied to air inlets of the electronic components (e.g., servers) disposed within the IT racks. Space between raised floor 106 and a sub-floor 104 defines the sub-floor plenum 108. Sub-floor plenum 108 serves as a conduit to transport, for example, cooled air from the air-conditioning units 102 to the electronics racks. In one embodiment, racks 101 are arranged in a hot aisle/cold aisle configuration, with their air inlet sides and air outlet sides disposed in alternating directions, as illustrated in FIG. 1. Cooled air 112 is provided through one or more perforated floor tiles 114 in raised floor 106 from sub-floor plenum 108 into the cold aisles of the data center. The cooled air is then drawn into electronics rack 101, via their inlets, and subsequently exhausted into the data center via one or more air outlets of the individual electronics racks into the hot aisles of the data center.

The air-conditioning units 102 typically receive chilled water from a refrigeration chiller plant (not shown). Each air-conditioning unit includes a blower motor to circulate air through the air-conditioning unit, and to provide the cooled air to the sub-floor plenum. As such, in most data centers, the air-conditioning units are simple heat exchangers consuming power needed to force the cooled air into the sub-floor plenum.

Figure 2:
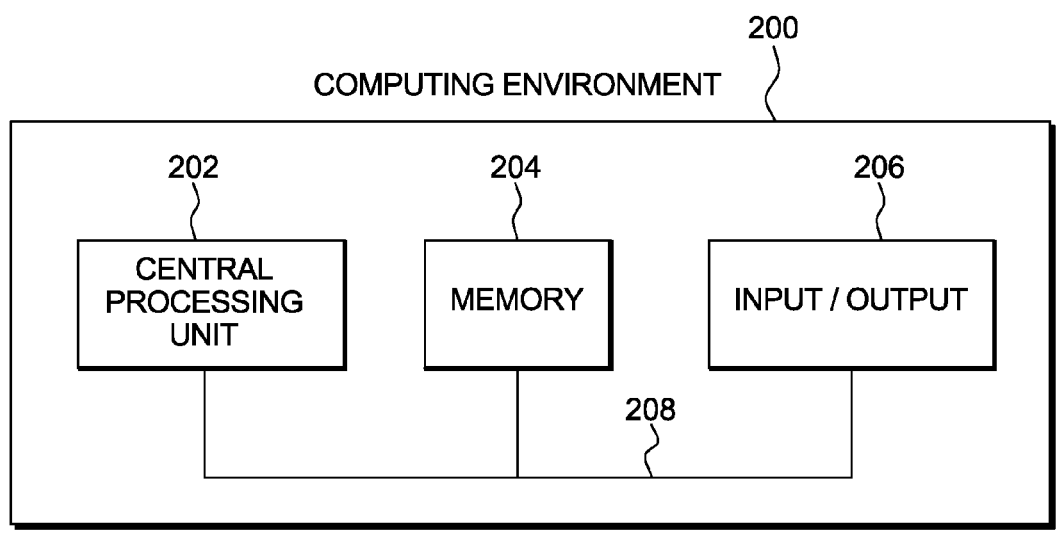
FIG. 2 depicts one embodiment of a computer system to implement computational fluid dynamics modeling of a bounded domain, in accordance with one or more aspects of the present invention.

Computational fluid dynamics (CFD) calculations or codes can be used to predict or model the airflow and temperature fields within a data center, or more generally, any bounded domain. FIG. 2 depicts one embodiment of a computing environment (or system) 200 which may be employed in the computation of these models. It should be understood that computing environment 200 represents only one embodiment for implementing the computational fluid dynamics modeling approaches described hereinbelow.

Computing environment 200 comprises, for instance, one or more processors (CPUs) 202, one or more of which may execute an operating system, such as the z/OS® operating system, offered by International Business Machines Corporation, Armonk, N.Y., USA, memory 204, and one or more input/output (I/O) devices/interfaces 206, coupled to one another via one or more buses 208. As one example, the computing environment may comprise one or more computer systems, each of which may include one or more components such as illustrated in FIG. 2, and each computer system may have the same or different components than another computer system.

For example, in another embodiment, a computer system to implement the computational fluid dynamics modeling approach disclosed herein, may comprise one or more processors, a network interface, a memory, a media interface and an optional display. The network interface allows the computer system to connect to a network, while the media interface allows the computer system to interact with media, such as a hard drive or removable media.

As explained further below, the methods disclosed herein may be distributed as an article of manufacture that itself comprises a machine-readable medium containing one or more programs, which when executing, implement embodiments of the present invention. For instance, the machine-readable medium may contain a program configured to divide the bounded domain into at least one viscous region and at least one inviscid region; perform viscous domain solve for the at least one viscous region using a turbulence model; perform inviscid domain solve for the at least one inviscid region using a set of inviscid equations; and provide results of the viscous domain solve and the inviscid domain solve as a model of the bounded domain.

The machine-readable medium may be a recordable medium (e.g., floppy disk, hard drive, optical disk, memory cards, etc.) or may be a transmission medium (e.g., a network comprising fiber optics, the world-wide web, cables, or a wireless channel using time-division multiple access, code-division multiple access, or other radio-frequency channel). Any medium known or developed that can store information suitable for use with a computer system may be used. In one embodiment, the machine-readable medium comprises a non-transitory, computer-readable storage device.

The processor can be configured to implement the methods, steps and functions disclosed herein. The memory can be distributed or local, and the processor can be distributed or singular. The memory could be implemented as an electrical, magnetic or optical memory, or any combination of these or other types of storage devices. Moreover, the term "memory" should be construed broadly enough to encompass any information able to be read from, or written to, an address in an addressable space accessible by the processor. With this definition, information on a network, accessible through the network interface, is within the memory because the processor can retrieve the information from the network. It should be noted that each distributed processor that makes up the one or more processors generally contains its own addressable memory space. It should also be noted that some or all of the computer system or computing environment can be incorporated into an application specific or general-use integrated circuit.

Computational fluid dynamics (CFD) methodologies using the Navier-Stokes (NS) equations may be used to predict the airflow and temperature fields within a data center model, or more generally, a bounded domain model. With one common approach, data center thermal and airflow modeling involves solving Navier-Stokes (NS) equations for irrotational flow $\nabla \times \vec{v} = 0$ using intensive computational fluid dynamics calculations, which can comprise as many as five coupled (non-linear) partial differential equations (one for conservation of mass, three for momentum conservation, and one for conservation of energy). Using a description of the fluid or gas (such as the ideal gas law which relates pressure p and temperature T), there are six equations for six unknowns (p, $v_x$, $v_y$, $v_z$, T, $\rho$) with four variables, x, y, z, t (see below). In order to solve these equations, Navier-Stokes computational fluid dynamics (NS-CFD) simulations are typically used, i.e., CFD is used to obtain numerical solutions.

The NS computations can be carried out as follows:

$$\frac{\partial \rho}{\partial t} + div(\rho \underline{v}) = 0,$$

$$\frac{\partial \underline{v}}{\partial t} + \underline{v} div(\rho \underline{v}) = -\frac{1}{\rho} grad(p) + \frac{v}{\rho} grad(div(\underline{v})) + E,$$

$$\rho c_P \underline{v} \left( \frac{\partial T}{\partial t} + grad(T) \right) + div(k\, grad(T)) + p div(v) h + v\phi + \rho c_p \frac{\partial p}{\partial t} = 0,$$

$$\rho(P, T) = \frac{Mp}{RT}, \nabla \times \vec{v} = 0,$$

wherein $C_p$ is specific heat, $\rho$ is air density, v is velocity vector, v is viscosity, F is external force, M is molar mass, $\Phi$ is viscous dissipation function, h is power dissipation/heat removal, T is absolute temperature, t is time, p is absolute pressure of medium (e.g., air), and R is the universal gas constant. According to one approach, three-dimensional thermal distribution and airflow measurements may be used in the NS-CFD calculations to provide a temperature and airflow model for the data center. The creation of a NS-CFD model using measurements is described, for example, in commonly assigned, U.S. Patent Publication No. 2009/0326879 A1, entitled "Techniques for Thermal Modeling of Data Centers to Improve Energy Efficiency".

Figure 3:
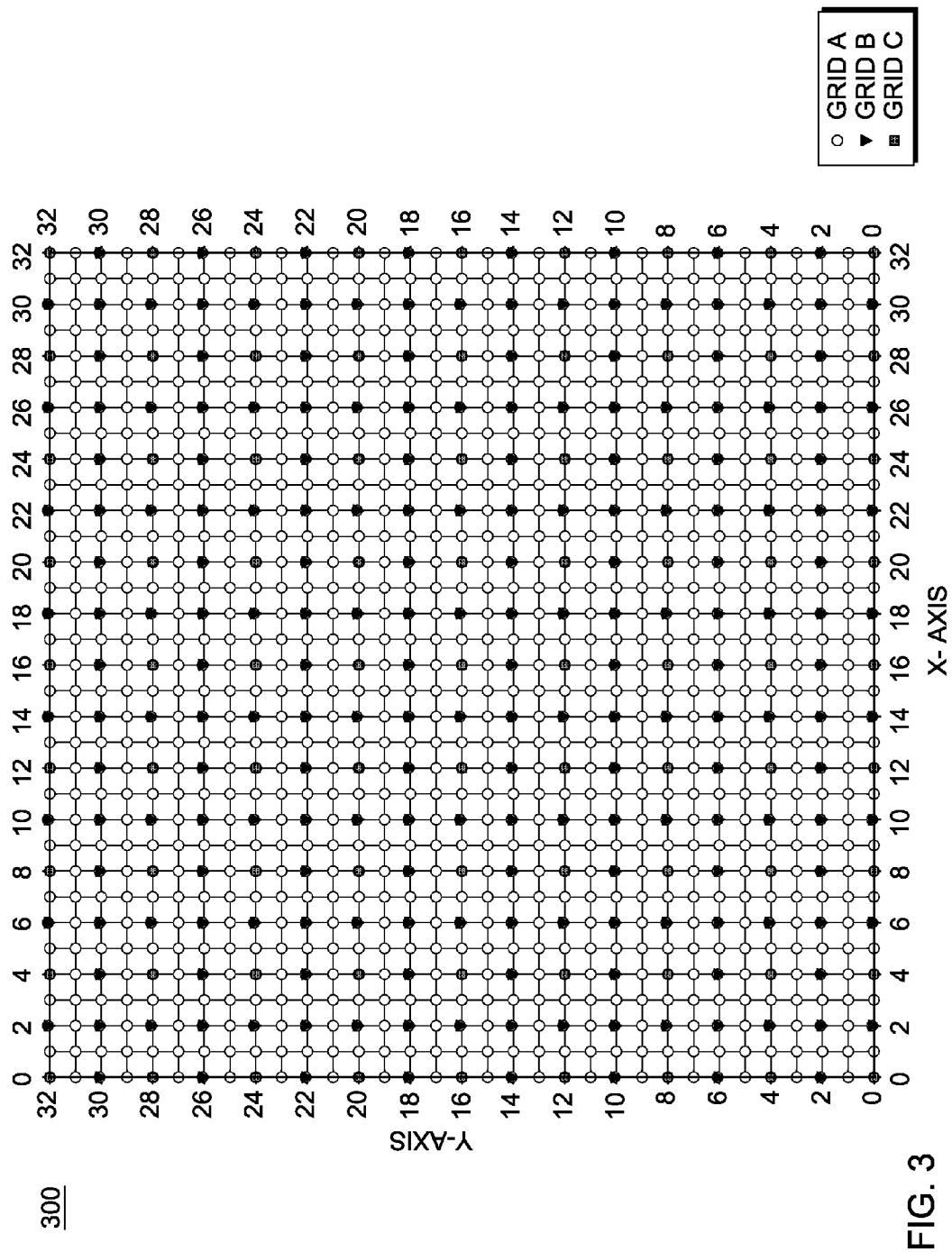
FIG. 3 depicts a conventional, 2-D fine multi-grid mesh of a solution domain used in capturing flow physics employing full Navier-Stokes equations and a computational fluid dynamics (CFD) model with turbulence equations.

In order to speed computation of these models, a multi-grid method may be employed. FIG. 3 illustrates one embodiment of a bounded domain 300 comprising a fine multi-grid mesh, which may be employed in CFD modeling of a bounded domain. Using the CFD methodology with NS equations and the relatively fine grids of a multi-grid such as depicted in FIG. 3, however, can take days in order to arrive at a reasonably accurate solution.

Faster solutions are desired to facilitate more data center layouts and scenarios being run and evaluated. This would enable the identification of inefficiencies and weaknesses in a data center layout, and allow for optimization of the data center layout for (for example) energy efficiency. This could in turn increase data center processing equipment reliability by reducing inlet air temperatures. Faster solutions would also permit transient analysis within the data center, allowing failure analysis to be performed on various pieces of equipment, and the fault tolerance of different designs to be evaluated. Faster solutions would also allow analysis of where recirculation within the data center is most likely to occur, and explore options that can be implemented to reduce entropy-generation (i.e., cold and hot air mixing), as well as locate localized hot spots within the data center.

Faster approaches which retain accuracy have been proposed (reduced order modeling techniques), but tend to rely on statistical analysis and interpolation of other CFD models. These models have proven to speed computation for specific cases, but must be built for certain arrangements and conditions that are not universally applicable. They require a database of previous solutions to work from, which takes time to build, and resources to maintain.

As an alternative approach, certain assumptions can be made about conditions in the data center. For example, it might be assumed that there is an irrotational velocity field, no turbulence, constant density, free slipping over boundaries (slipless), and viscous forces are much less than inertial forces (i.e., viscous forces can be neglected). By way of these assumptions, the Navier-Stokes equations (shown above) can be simplified.

With zero divergence (volume conservation), i.e., $\nabla v = 0$, and zero rotation, i.e., $v = \nabla \phi$, the simplified equations provide a temperature and airflow model for the data center as follows:

$$\nabla^2 \phi = 0 \qquad (1)$$

$$\rho c_p v\, grad(T) + div(k\, grad(T)) + h = 0, \qquad (2)$$

wherein $\nabla^2 \phi = 0$, that is:

$$\nabla^2 \phi = \frac{\partial^2 \phi}{\partial x^2} + \frac{\partial^2 \phi}{\partial y^2} + \frac{\partial^2 \phi}{\partial z^2} = 0,$$

is an airflow field and $\rho c_p v\operatorname{grad}(T)+\operatorname{div}(k\operatorname{grad}(T))+h=0$ is a temperature field (wherein $\rho$ is air density, $c_p$ is specific heat, v is velocity vector, T is absolute temperature, h is power dissipation/heat remove, and k is thermal conductivity).

More particularly, potential flow theory may be employed assuming constant (temperature independent) air density, free slipping over boundaries and that viscous forces can be neglected, i.e., $$\nabla^2\phi = \frac{\partial^2\phi}{\partial x^2}+\frac{\partial^2\phi}{\partial y^2}+\frac{\partial^2\phi}{\partial z^2}=0, \text{ and } v_x=\frac{\partial\phi}{\partial x}, v_y=\frac{\partial\phi}{\partial y}, v_z=\frac{\partial\phi}{\partial z},$$

wherein $\phi$ is flow potential and $v_x$, $v_y$, and $v_z$ are air flow velocity components in x, y and z directions, respectively. Equation (1) (air flow equation) above cannot be solved without applying the correct boundaries. Various, measurement manufacturers' data and/or modeling techniques may be employed to supply these boundaries, which are fed into the model. For example, the input and output of the CRACs (or the output of the perforated tiles) are sources (e.g., $$\frac{\partial\phi}{\partial y}=-(\text{measured})$$

output air flow from a perforated tile) and the air returns to the CRACs can be sinks (e.g.

$$\frac{\partial\phi}{\partial y}=+(\text{measured})$$

CRAC air flows), while the racks are sinks (e.g., $$\frac{\partial\phi}{\partial x}=+(\text{measured})$$

inlet rack air flow) at the inlet(s) and sources (e.g., $$\frac{\partial\phi}{\partial x}=-(\text{measured})$$

outlet rack air flow) at the outlet(s).

In order to solve Equation (1), an arbitrary relative value for the flow potential $\phi=0$ has to be set somewhere in the data center. In some cases, it may be desirable to set the flow potential to zero at the air returns of the CRACs (i.e., assuming an infinite sink) or in an area where it can accurately be assumed that there is minimal air velocity, such as behind one of the CRACs. All of the source and sink flow boundaries can be taken directly from the equipment manufacturers' data or can be obtained directly from measurements to define the "flow boundaries" of Equation (1). Outer parts of the modeling domain, such as the data center walls and ceiling, have natural boundaries, as is commonly applied in partial differential equation problems.

In general, with any of the data center models described herein, the inputs can include, but are not limited to, the rack heat loads (i.e., power dissipated by the IT racks, which is equal to the power consumed by the racks to perform computational work) and (inlet/outlet) airflow rates, the CRAC's heat removal rate, supply temperature and airflow rates (which is equivalent to supplied cool airflow rate or return hot air rate), as well as several other miscellaneous parameters. These miscellaneous parameters can include, but are not limited to, tile perimeter leakage flow rates, location of cable openings (which can serve as air passages, e.g., into-out of the racks/the data center), the perforated tile airflow rates and temperature, and/or direction of CRAC's airflow.

Although employing potential flow equations (i.e., a set of inviscid equations) results in a faster modeling of the bounded domain, significant accuracy can be lost by ignoring turbulence within the bounded domain. Thus, disclosed hereinbelow with reference to FIGS. 4-14 is the concept of solving the CFD model in multiple regions using different modeling techniques for the different regions of the bounded domain based on flow physics. The entire bounded domain model is broken into a number of regions that are solved separately using appropriate equations, as explained further below. Two principle categories of regions are the viscous regions and the inviscid regions. Between these regions is defined an interface region, which allows the viscous and inviscid regions to transfer flow physics back and forth during the modeling. The inviscid equations are much simpler (and hence faster to solve) than the viscous equations, and these regions can take up the majority of the space in a data center. The inviscid equations also allow for coarser meshes than the viscous equations for the same accuracy in the solution, which further increases the solver's speed. By solving the inviscid equations instead of the viscous equations (as is conventionally done today) in these regions, faster solutions are obtained with virtually no loss of accuracy. The use of multiple regions also allows for different turbulence models to be employed in different viscous regions of the data center. This allows for not only faster computation, but more accurate results in the viscous regions.

By way of explanation (and example), the following terms are employed herein:

Set of inviscid equations—(a/k/a Euler Equations): A subset of the Navier-Stokes Equations with the divergence of the flow field equal to zero.

Inviscid region—A region in the domain where the inviscid equations are used to solve for the flow and temperature fields.

Viscous region—A region in the domain where the full Navier-Stokes Equations are used to solve for the flow and temperature fields.

Interface region—An overlap region that serves to separate the inviscid and viscous regions, which also applies the boundary conditions for the two solvers and their different grids.

Turbulence Threshold Criteria—The criteria used to define the location of the interface region which separates the inviscid and viscous regions.

Multi-Grid (MG) Method of solving the governing equations on multiple grid levels in order to reduce convergence time. This is accomplished by reducing the global (low frequency) errors in the solution by solving on coarser grid levels, since the solver effectively reduces only the local (high frequency) error on each grid level.

Figure 4:
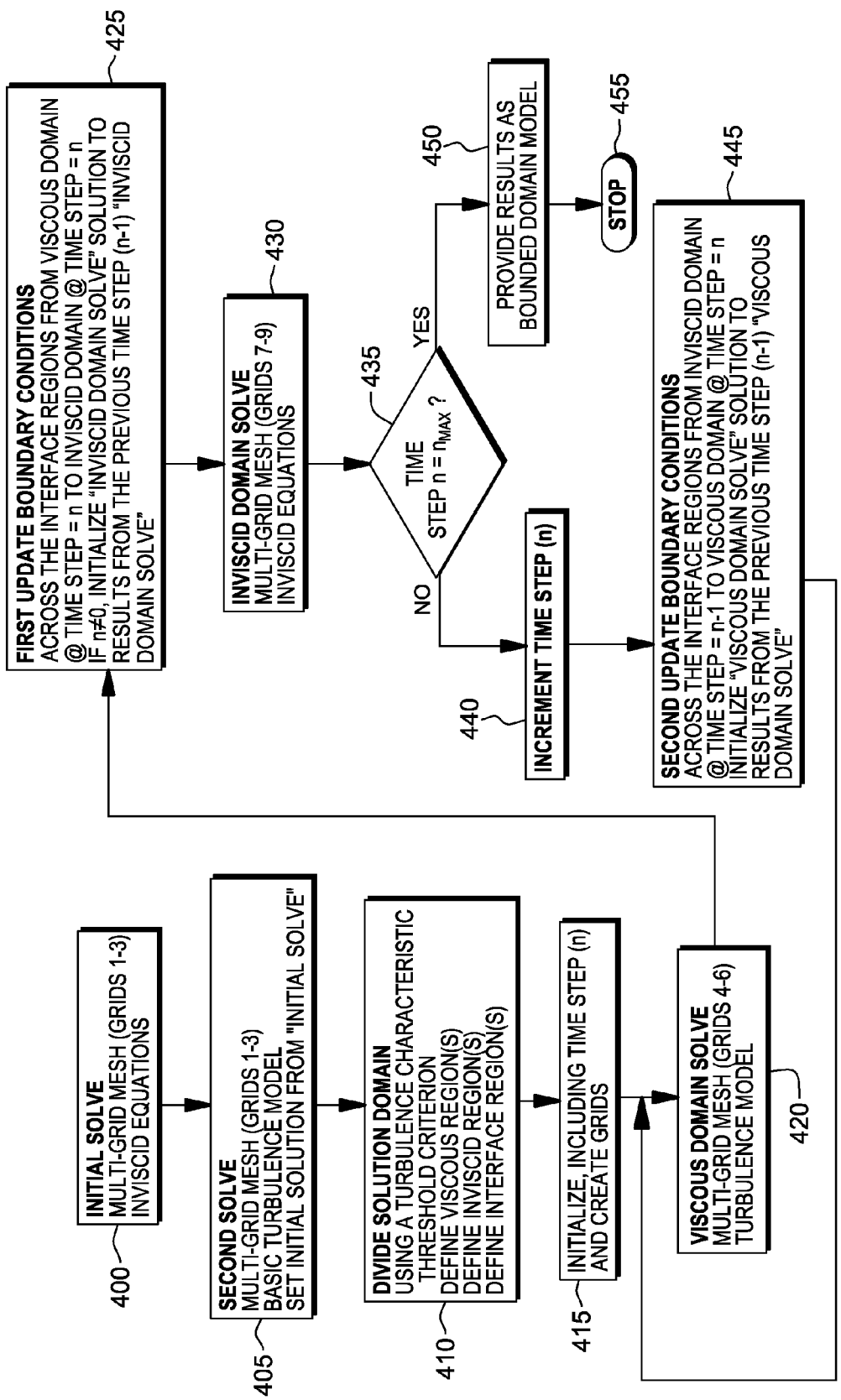
FIG. 4 depicts one embodiment of an approach for computational fluid dynamics modeling of a bounded domain, in accordance with one or more aspects of the present invention.

FIG. 4 is an overview of one embodiment of a computational fluid dynamics modeling approach for a bounded domain, in accordance with one or more aspects of the present invention. In the depicted embodiment, processing begins by initially solving (or modeling) the bounded domain using a set of inviscid equations, and (in one approach) a multi-grid mesh 400.

Figure 5A:
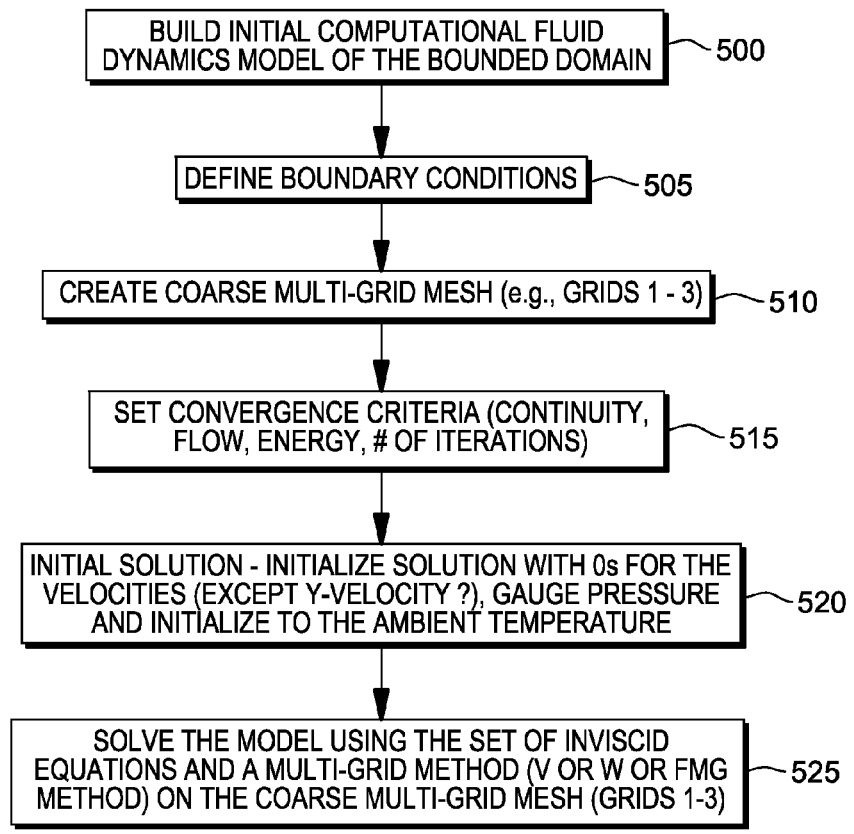
FIG. 5A depicts one embodiment of an initial solve process for the computational fluid dynamics modeling approach of FIG. 4, in accordance with one or more aspects of the present invention.
Figure 5B:
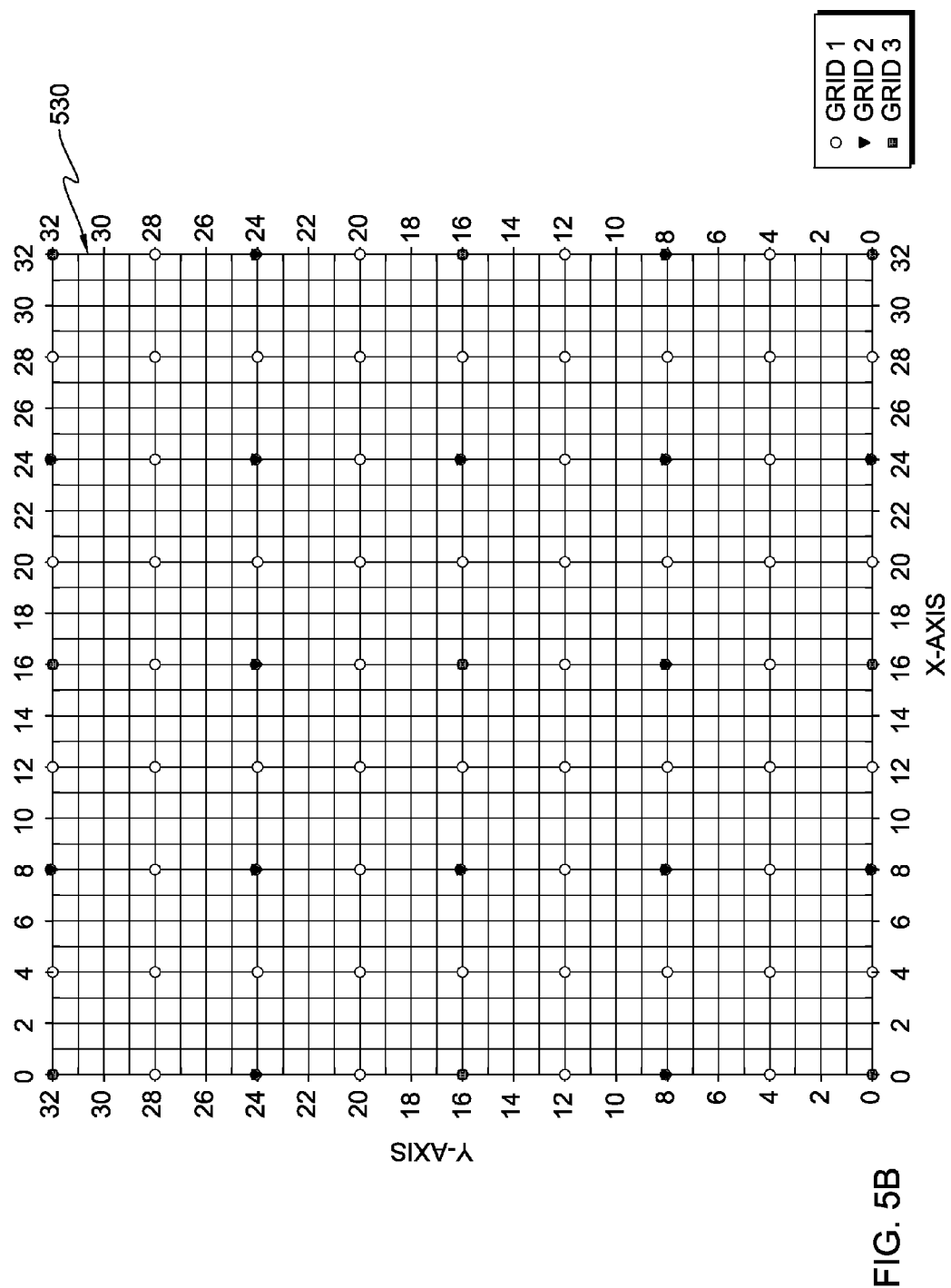
FIG. 5B depicts one embodiment of a 2-D coarse multi-grid mesh employed by the initial solve process of FIG. 5A, in accordance with one or more aspects of the present invention.

FIG. 5A depicts one embodiment of the initial solve 400. In this embodiment, a computational fluid dynamics model of the data center is built 500, and boundary conditions are defined 505 for the computational fluid dynamics model (as explained above). The computational fluid dynamics model could be built with a commercially-available CFD code, such as ANSYS FLUENT flow modeling software, available from ANSYS, Inc., of Canonsburg, Pa., USA. Next, a coarse multi-grid mesh (e.g., grid 1-3) is created for the solution domain 510. FIG. 5B illustrates one example of a bounded domain 530, such as a data center room, and a coarse multi-grid mesh (comprising grids 1-3) for use during the initial solve 400.

As illustrated in FIG. 5B, each grid (e.g., grid 1, grid 2 and grid 3) sets out a geometric pattern across the bounded domain 530, which results in a plurality of cells being defined in the bounded domain. For example, a cell is the space within the domain defined by adjoining points in the respective grid pattern. The coarse multi-grid mesh depicted in FIG. 5B is also referred to herein as a "coarse mesh" for the initial solve. The boundary conditions refer to conditions at the boundary of the solution domain. For example, reference the solid line around the perimeter of the bounded domain 530 depicted in FIG. 5B.

Continuing with the embodiment of FIG. 5A, initial solve processing next comprises setting convergence criteria for the solve 515. Convergence can be achieved by meeting pre-defined residuals criteria for the continuity, flow and/or energy equations or a preset number of iterations through the initial solve. The solution domain model is initialized with substantially all zeros for the velocities and gauge pressure, along with an ambient temperature 520. As an option, one of the variables, such as y-velocity, may be a small, non-zero value (e.g., 0.0001) to ensure that the solver processes the initial solve.

Processing then solves the initial computational fluid dynamics model of the bounded domain using the set of inviscid equations (described above) and a multi-grid method, such as a V-multi-grid method, W-multi-grid method, or FMG-multi-grid method, each of which are known in the multi-grid processing art. As known, multi-grid processing, when solving computational fluid dynamics equations, will facilitate solving of the equations. In a V-multi-grid processing method, the solver begins with the finest grid and progresses to the coarsest grid through restrictions, and then progresses back to the finest grid through interpolation. Similarly, one implementation of the W-multi-grid method starts with the finest grid and restricts down to the coarsest grid, and then interpolates up a grid level, and then restricts down a grid level, and then interpolates back to the finest grid. Other variations of the basic V and W methods of restriction and interpolation can facilitate increased solver speed. In addition, one of ordinary skill in the art could readily employ a full-multi-grid (FMG) method, if desired.

Continuing with the overview process of FIG. 4, after the initial solve 400, a second solve is performed 405. In one embodiment, this second solve employs the coarse mesh grids employed in the initial solve (e.g., see FIG. 5B), along with a basic turbulence model, and the initial solution from the initial solve 400. As noted, a "turbulence model" is used herein to refer to a computational fluid dynamics model with turbulence equations. As explained above, a computational fluid dynamics model with turbulence equations presents a more complex solution than a solve employing a set of inviscid equations only, such as the case with the initial solve 400.

Figure 5C:
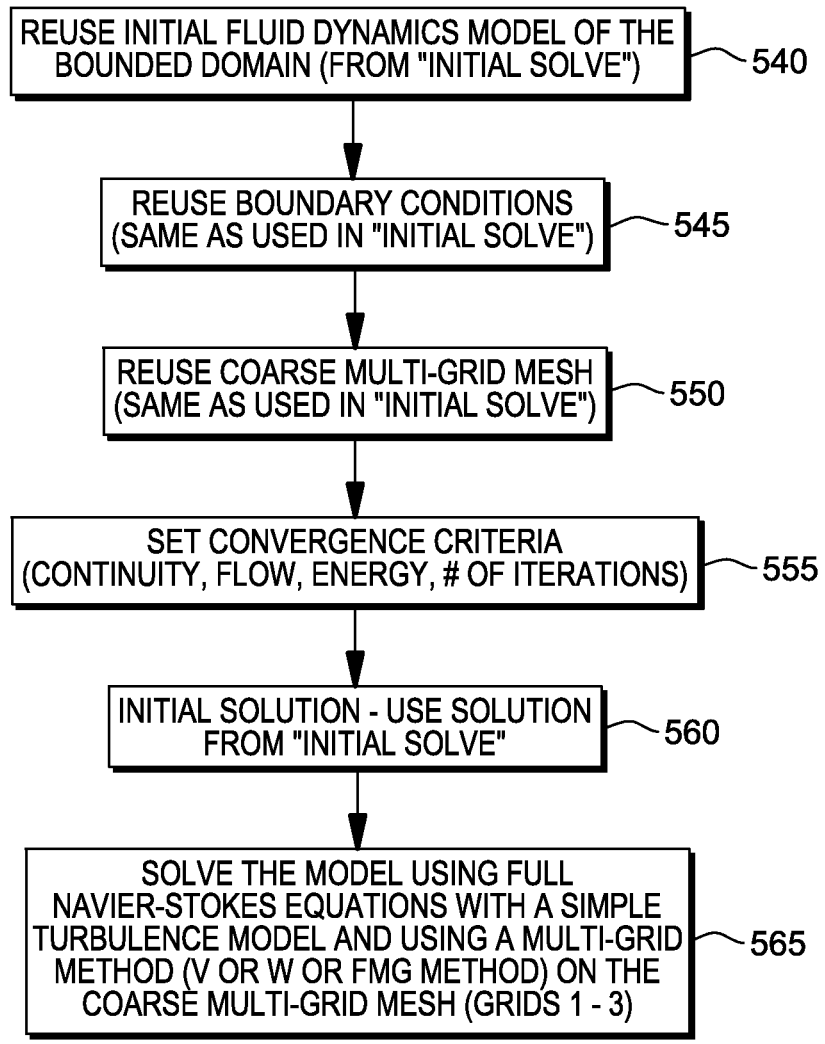
FIG. 5C depicts one embodiment of a second solve process for the computational fluid dynamics modeling approach of FIG. 4, in accordance with one or more aspects of the present invention.

FIG. 5C depicts one embodiment of the second solve process 405. As noted, in one embodiment, the second solve reuses the initial fluid dynamics model of the bounded domain from the initial solve 540, and reuses the boundary conditions employed in the initial solve 545, and the coarse multi-grid mesh (e.g., see FIG. 5B) used in the initial solve 550. The convergence criteria is set based on, for example, continuity, flow, energy or number of iterations 555, which for the second solve, may be the same or different from the criteria used in the initial solve. As an initial solution to the second solve, the solution from the initial solve is employed 560. The second solve solves the initial fluid dynamics model for the bounded domain using the full Navier-Stokes equations (discussed above) with a simple turbulence model (e.g., zero equation turbulence model) and uses (in one embodiment) a multi-grid processing approach (whether V, W, or FMG processing) 565. As part of the solution to the second solve, the cells of the one or more grids will have associated therewith one or more turbulence characteristics.

Figure 6A:
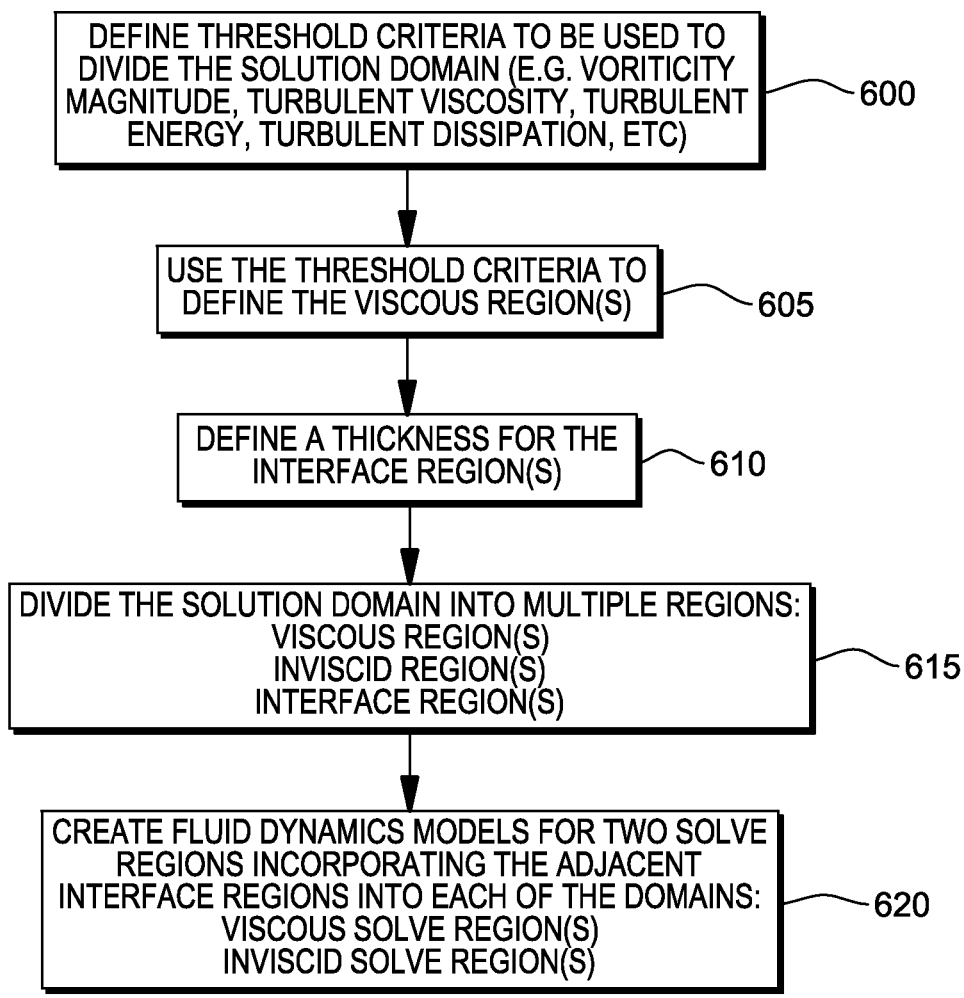
FIG. 6A depicts one embodiment of a process for dividing the bounded domain into one or more viscous regions, one or more inviscid regions, and one or more interface regions, in accordance with one or more aspects of the present invention.

Returning to the overview process of FIG. 4, processing next divides the domain into one or more viscous regions and one or more inviscid regions 410. One detailed process for dividing the domain is illustrated in FIG. 6A.

Initially, a threshold criteria is defined for use in dividing the bounded domain 600. This threshold criteria may comprise a threshold of a turbulence characteristic associated with the cells of the coarse multi-grid mesh employed in the first and second solves. By way of example, the turbulence characteristic is a flow characterization, such as vorticity magnitude, turbulent viscosity, turbulent kinetic energy, turbulent dissipation, etc. The threshold criteria and the associated turbulence characteristics of the cells are used in defining one or more viscous regions 605. A thickness of an interface region(s) is defined, wherein the interface region(s) comprises a region(s) of the bounded domain between the one or more viscous regions and one or more inviscid regions 610. The domain is then divided into multiple regions, including one or more viscous regions, one or more inviscid regions, and one or more interface regions 615. Different fluid dynamic models are created for the different viscous and inviscid regions, incorporating the adjacent interface regions into each of the respective sub-domains, resulting in one or more viscous solve regions and one or more inviscid solve regions 620.

Figure 6B:
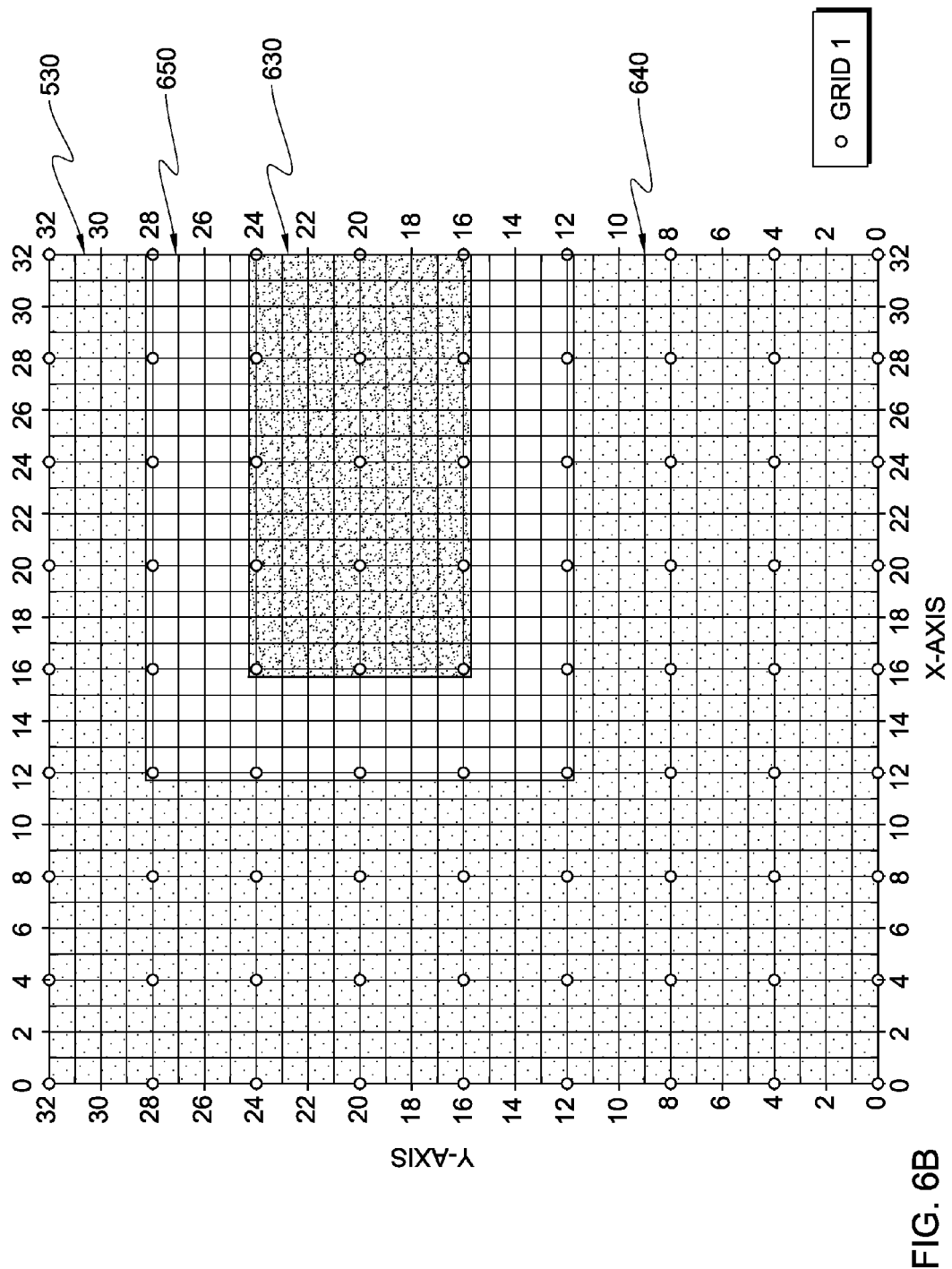
FIG. 6B depicts one embodiment of a 2-D bounded domain divided into a viscous region, an interface region, and an inviscid region, in accordance with the processing of FIG. 6A, and in accordance with one or more aspects of the present invention.

FIG. 6B illustrates (by way of example only) bounded domain 530 divided into a viscous region 630, an inviscid region 640, and an interface region 650 disposed between the viscous region and the inviscid region. In this example, interface region 650 is assumed to be one cell thick, and as explained further below, facilitates passing boundary conditions between the viscous region's solve and the inviscid region's solve. Note that in practice, there may be multiple separate viscous regions and/or multiple separate inviscid regions within the bounded domain. Note also that the interface region disposed between a particular viscous region and inviscid region, is joined as part of both regions in the solve processing described herein.

Figure 7:
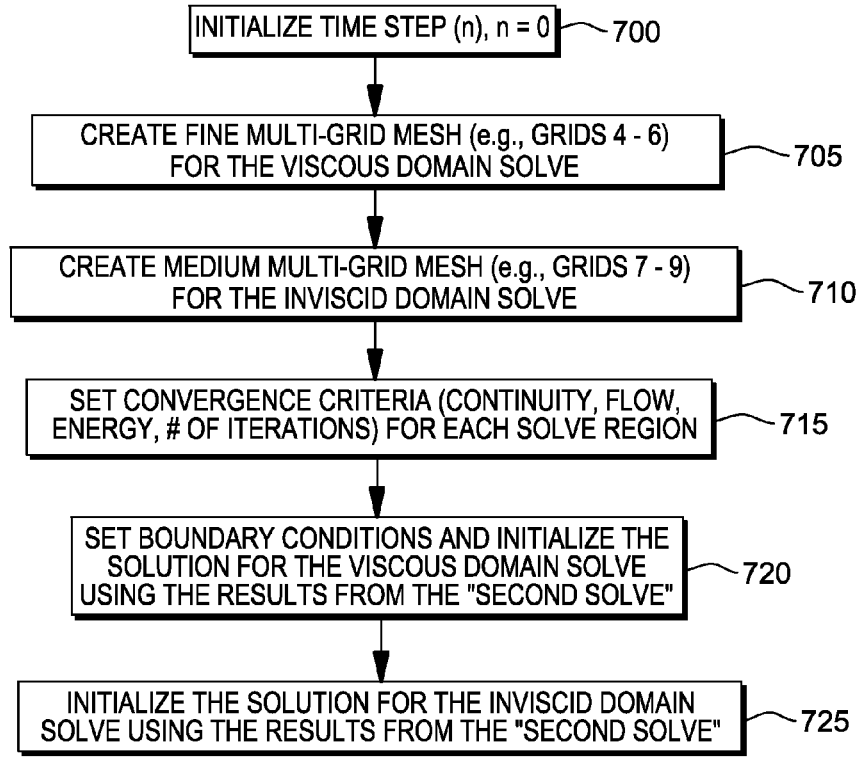
FIG. 7 depicts one embodiment of an initializing process, including initializing a time step (n), for the computational fluid dynamics modeling approach of FIG. 4, in accordance with one or more aspects of the present invention.

Continuing with the overview process of FIG. 4, the separate solutions are initialized, including a time step (n) 415. FIG. 7 illustrates one example of an initialization process.

In FIG. 7, in addition to initializing the time step (n), that is, setting time step (n) equal to zero 700, a fine multi-grid mesh (e.g., grids 4-6) for use in the viscous domain solve is created 705, as well as a medium multi-grid mesh (e.g., grids 7-9) for the inviscid domain solve 710. As noted, the viscous domain solve involves solving for the one or more viscous regions, and the inviscid domain solve involves solving for one or more inviscid regions of the domain. Convergence criteria is set for each region 715. This convergence criteria may comprise, for example, a continuity criteria, a flow criteria, an energy criteria, or a number of iterations through the solution routine and may differ for each region. Next, boundary conditions are set and the solution for the viscous domain solve is initialized using the results from the second solve processing described above (see FIG. 5C) 720. The solution for the inviscid domain solve is initialized using the results from the second solve 725.

Figure 8A:
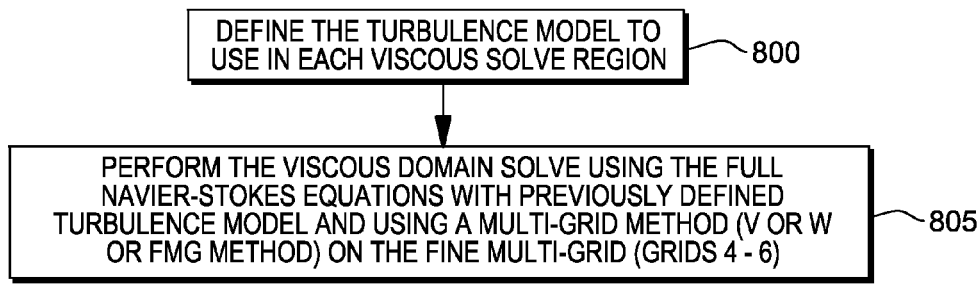
FIG. 8A depicts one embodiment of a viscous domain solve for the computational fluid dynamics modeling approach of FIG. 4, in accordance with one or more aspects of the present invention.

As shown in FIG. 4, viscous domain solve is next performed for the one or more viscous solve regions using at least one turbulence model 420. As illustrated in FIG. 8A, this solve may include defining a turbulence model to use for each viscous solve region of the viscous domain solve 800. As noted, the turbulence model refers to a computational fluid dynamics model with turbulence equations, and a viscous solve region refers to a particular viscous region and its associated interface region (whereas an inviscid solve region refers to a particular inviscid region and its associated interface region). The same turbulence model or different turbulence models may be applied to different viscous solve regions of the domain. For example, depending on the extent of turbulence within the different viscous solve regions, different turbulence models may be desirable. Viscous domain solve is performed for the one or more viscous solve regions using the full Navier-Stokes equations, with the previously defined turbulence model, and using a multi-grid method (whether V, W or FMG method) with a fine multi-grid mesh (e.g., grids 4-6) previously initialized.

Figure 8B:
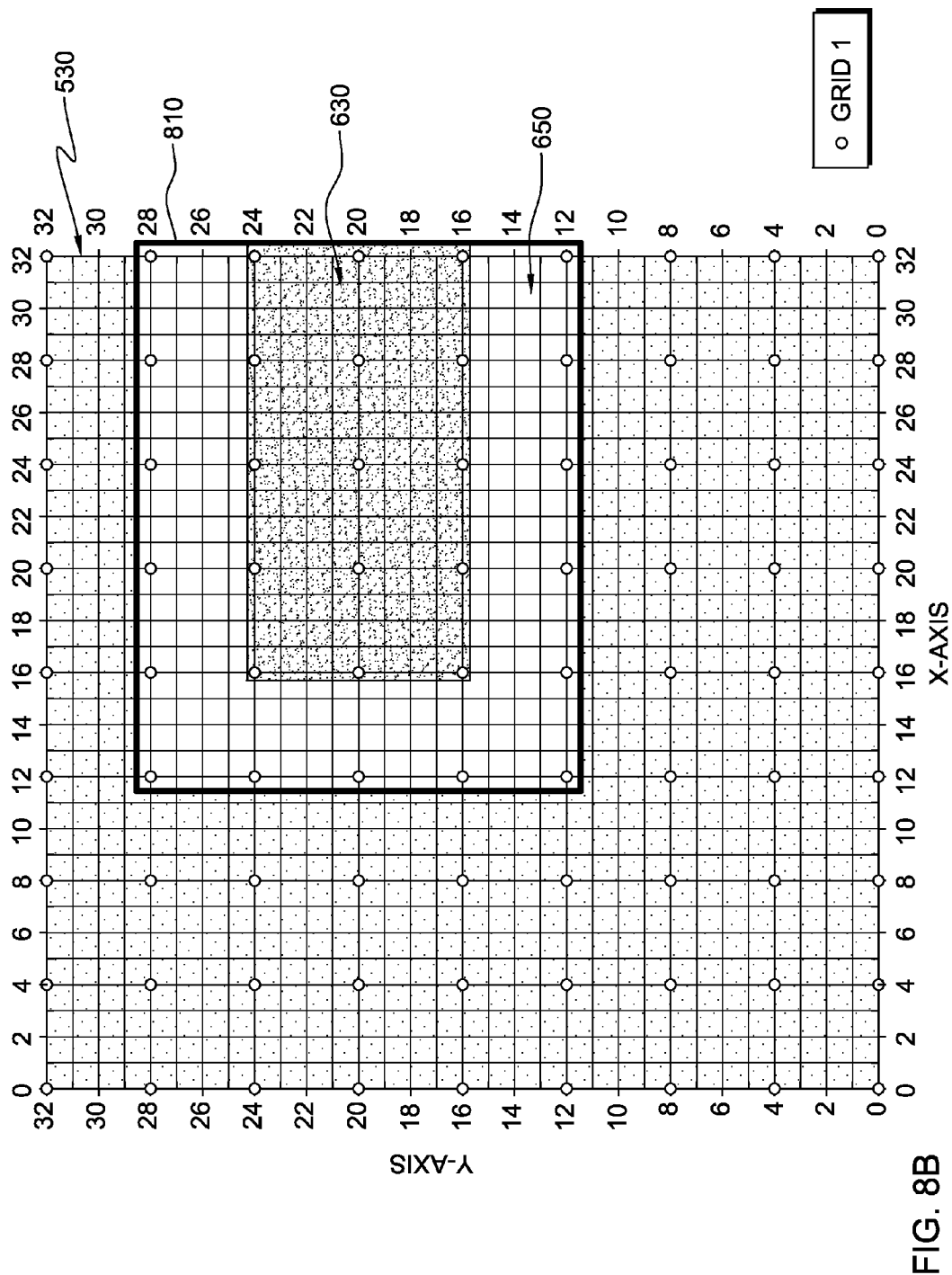
FIG. 8B depicts one embodiment of a 2-D bounded domain and illustrates a viscous region, an interface region and a boundary for boundary conditions for use in the viscous domain solve process of FIG. 8A, in accordance with one or more aspects of the present invention.

By way of example, FIG. 8B depicts bounded domain 530 with a viscous solve region comprising viscous region(s) 630 and interface region(s) 650. The figure illustrates a boundary 810 for the viscous region's boundary conditions to be employed in the viscous domain solve.

Figure 8C:
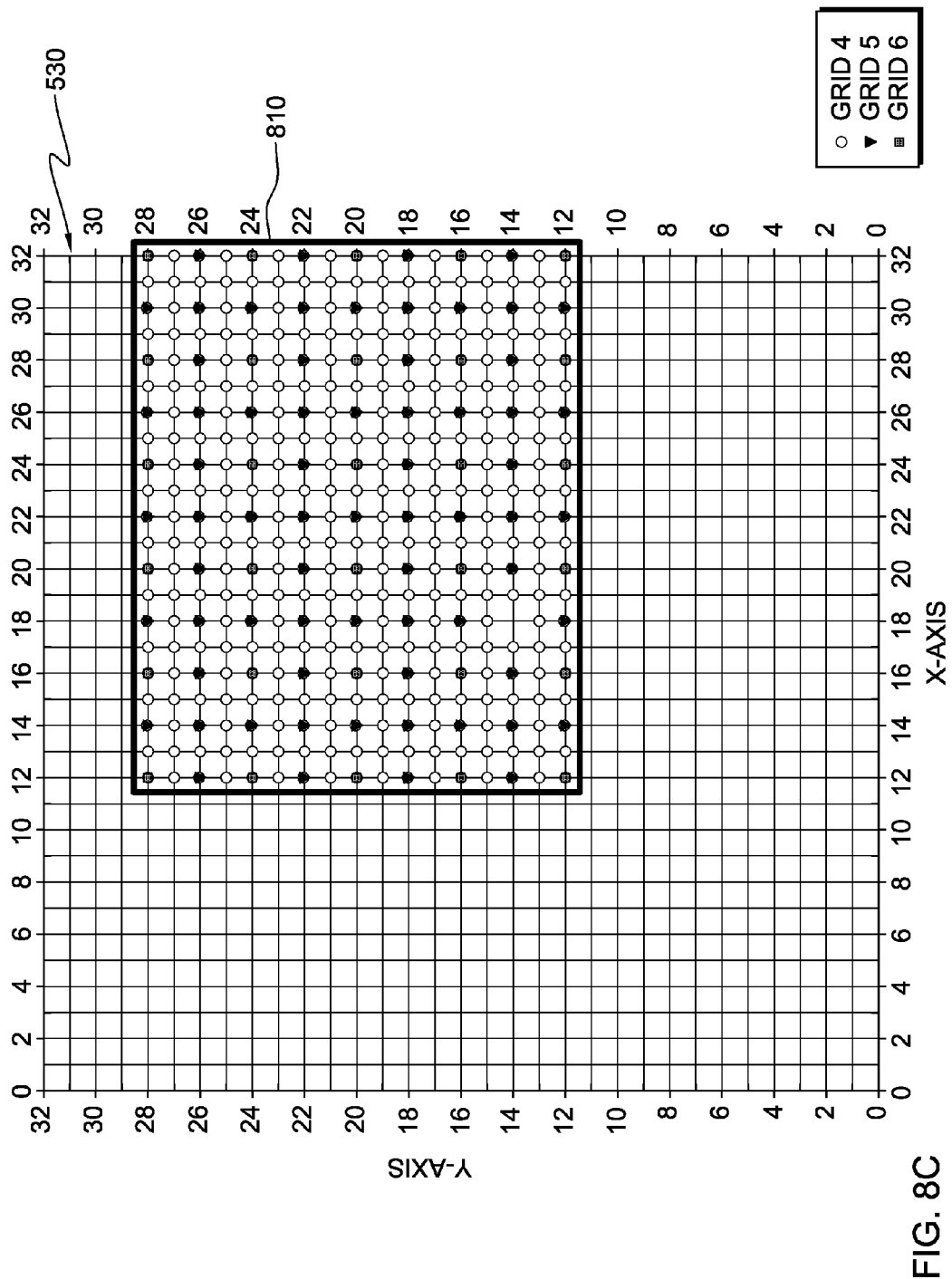
FIG. 8C depicts the 2-D bounded domain of FIG. 8B, and illustrates a fine (or dense) multi-grid mesh for use in the viscous domain solve of the viscous region and interface region using a turbulence model, in accordance with the processing of FIG. 8A, and in accordance with one or more aspects of the present invention.

FIG. 8C depicts the viscous solve region of FIG. 8B, that is, the region within viscous region's boundary 810, sub-divided using a fine multi-grid mesh comprising grids 4-6 (in this example). As illustrated in FIG. 8C, the fine multi-grid mesh (e.g., grids 4-6) is more dense than the initial coarse multi-grid mesh (e.g., grids 1-3) employed in the initial and second solves described above. Greater density for the cells to be solved is desirable in this location in view of the turbulent nature of the viscous solve region.

Continuing with the overview process of FIG. 4, processing next performs a first update of boundary conditions 425 to update boundary conditions across the interface region(s) from the viscous domain at time step (n) to the inviscid domain at time step (n). One embodiment of this processing is depicted in FIG. 9.

As shown, the boundary conditions are set, except along the interface region(s) for the inviscid domain solve(s) 900. Boundary conditions along the interface regions for the inviscid domain solve are then set using the results from the viscous domain solve at time step (n) 905. If time step (n) is other than zero, then the solution for the inviscid domain solve is initialized using the results from the previous inviscid domain solve at time step (n−1) 910.

Figures 9, 10A:
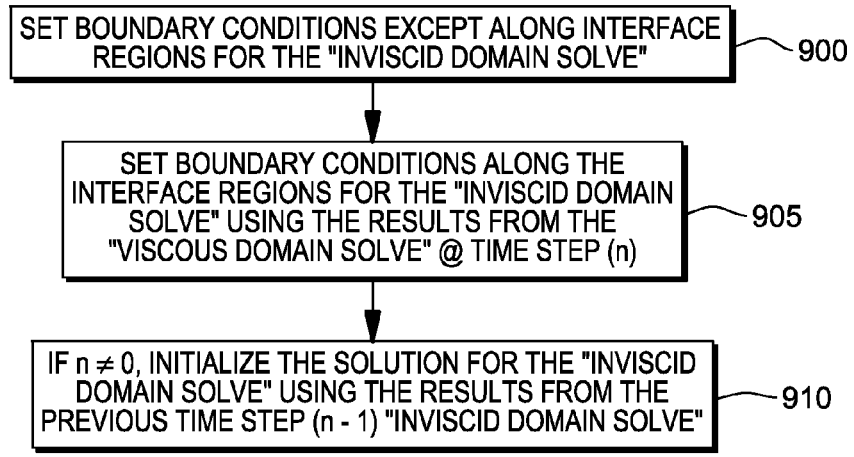
FIG. 9 illustrates one embodiment of a first update boundary conditions process (along the interface region(s) for the inviscid domain solve) for the computational fluid dynamics modeling approach of FIG. 4, in accordance with one or more aspects of the present invention.
FIG. 10A depicts one embodiment of an inviscid domain solve process for the computational fluid dynamics modeling approach of FIG. 4, in accordance with one or more aspects of the present invention.

The inviscid domain solve process 430 of FIG. 4 is also depicted in FIG. 10A, wherein the solve for the inviscid solve regions occurs using the set of inviscid equations and a multi-grid method (whether V, W, or FMG method) with the medium multi-grid mesh (e.g., grids 7-9).

Figure 10B:
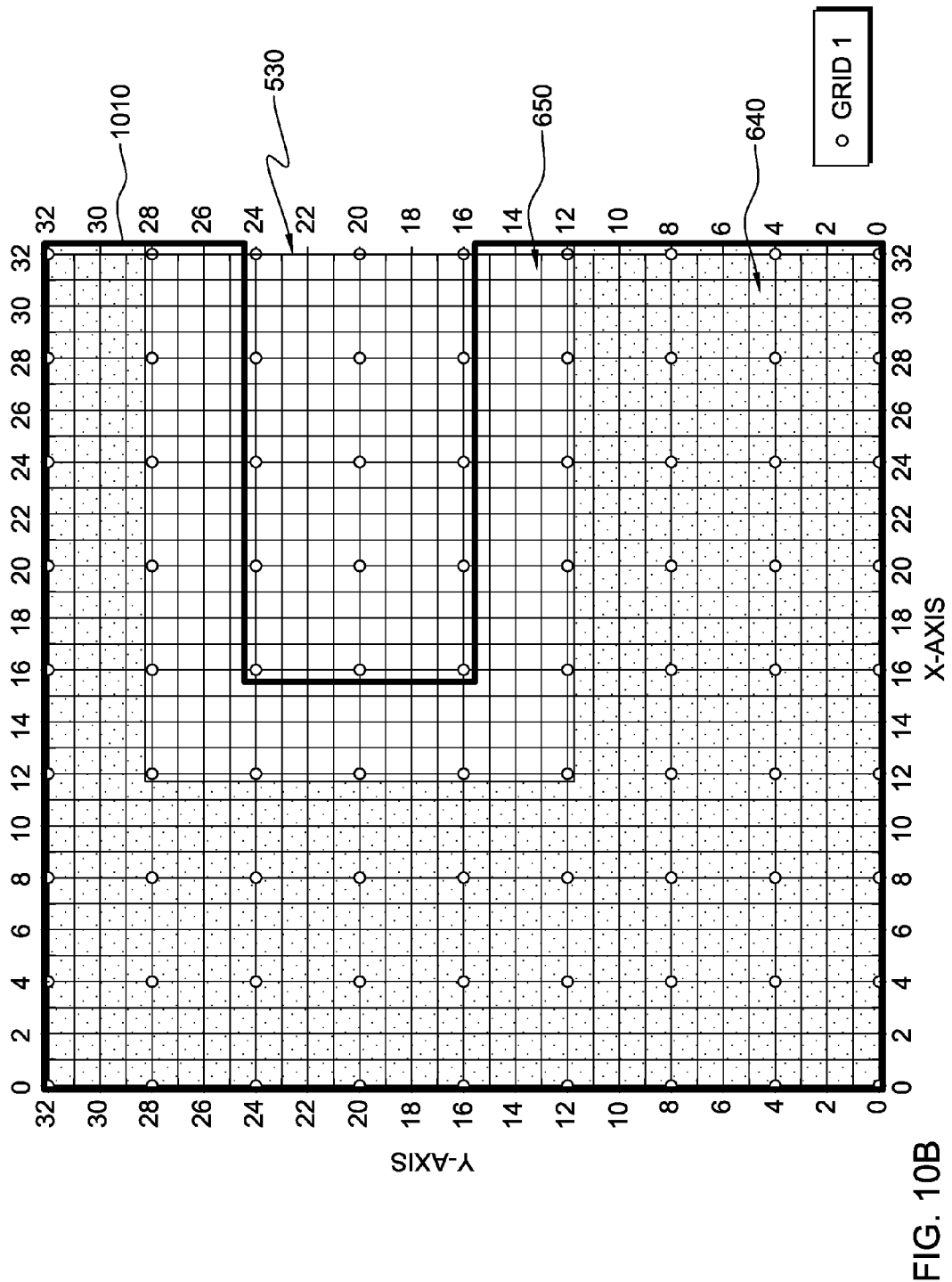
FIG. 10B depicts the 2-D bounded domain, and illustrates one example of the inviscid region and interface region, along with a boundary for boundary conditions for the inviscid domain solve process, in accordance with one or more aspects of the present invention.

FIG. 10B depicts one embodiment of the domain 530 and the inviscid solve region comprising the one or more inviscid region(s) 640, and the one or more interface region(s) 650. The figure illustrates the boundary 1010 for the inviscid region's boundary conditions.

Figure 10C:
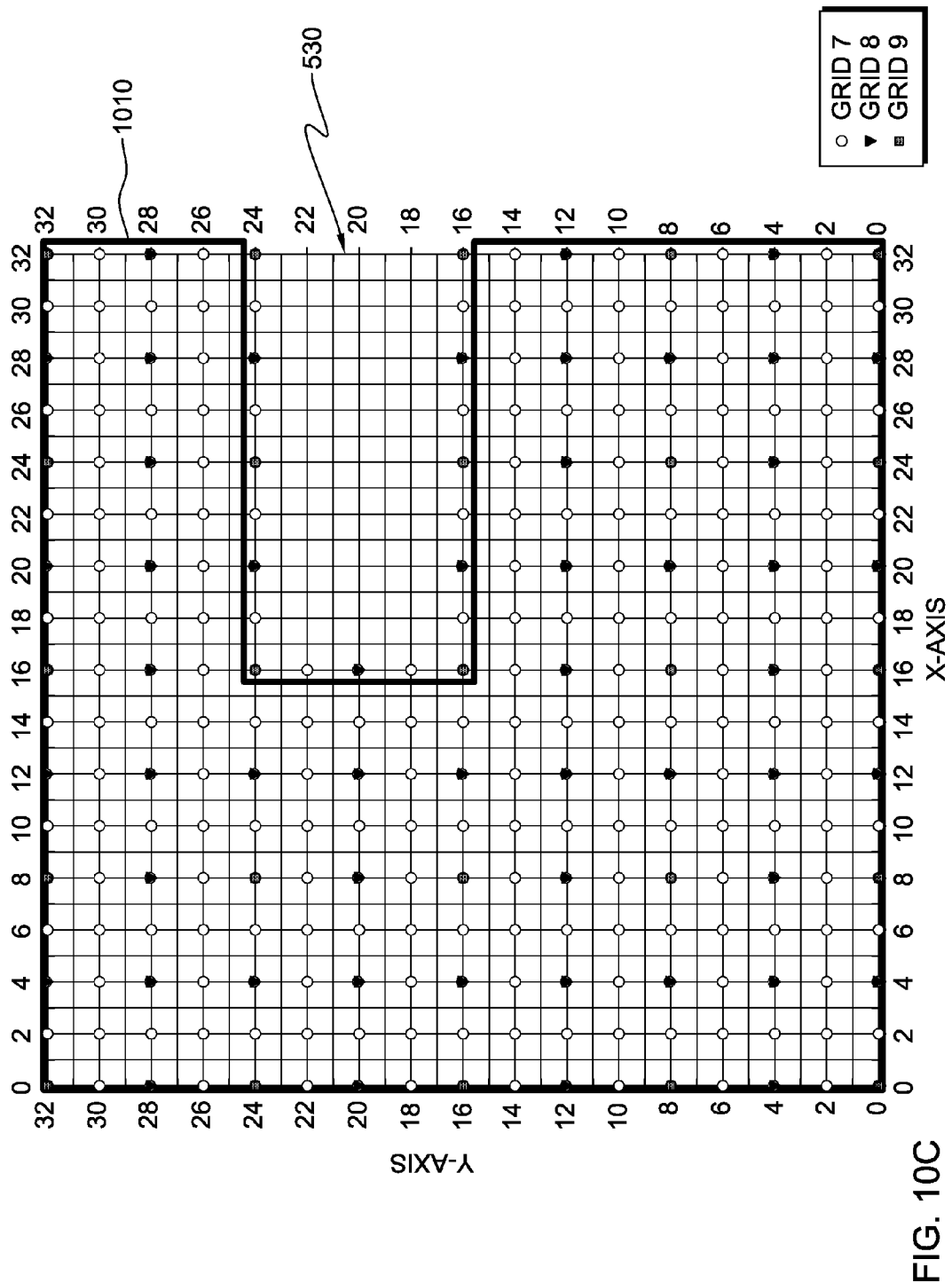
FIG. 10C depicts the 2-D bounded domain of FIG. 10B, and illustrates a medium multi-grid mesh for use in the inviscid domain solve of the inviscid region and interface region using a set of inviscid equations, in accordance with the processing of FIG. 10A, and in accordance with one or more aspects of the present invention.

In FIG. 10C, one embodiment of a medium multi-grid mesh (grids 7-9) is illustrated. By way of example, in one embodiment, the medium multi-grid mesh is more dense than the coarse multi-grid mesh employed in the initial and second solves, and is coarser than the dense (fine) multi-grid mesh employed in the viscous domain solve.

Figure 11:
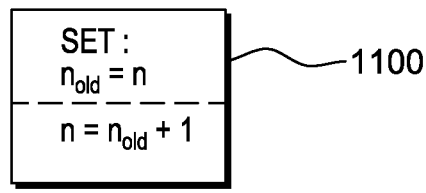
FIG. 11 depicts one embodiment of a process for incrementing a time step (n) employed in the computational fluid dynamics modeling approach of FIG. 4, in accordance with one or more aspects of the present invention.

Continuing with the process of FIG. 4, after the inviscid domain solve 430, a determination is made whether time step (n) has reached a predefined maximum time step ($n_{max}$) 435. If "no", then the time step (n) is incremented 440 by, for example, setting time step ($n_{old}$) equal to time step (n), and then incrementing the old time step ($n_{old}$) to arrive at a new time step (n) 1100, as shown in FIG. 11. Processing then performs a second update of boundary conditions 445 to update boundary conditions across the interface region(s), from the inviscid domain at time step (n−1), to the viscous domain at time step (n).

Figure 12:
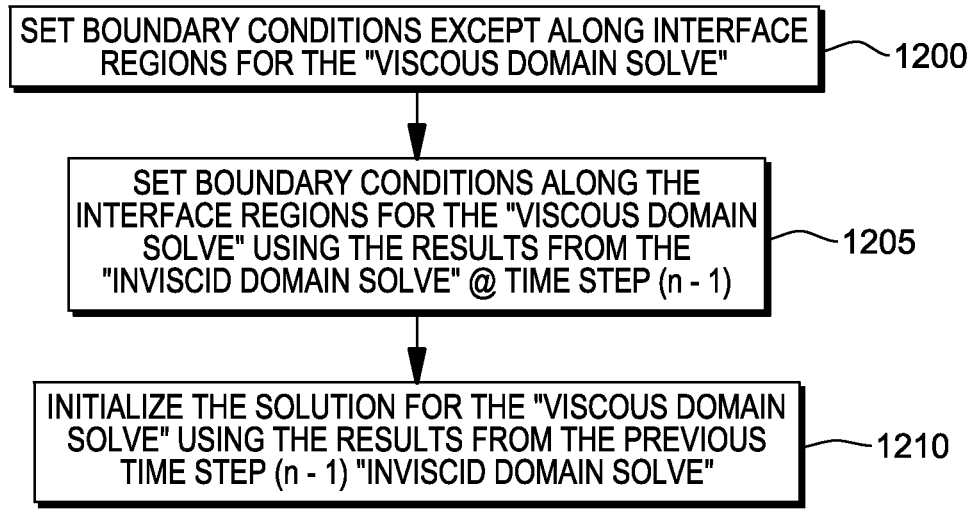
FIG. 12 depicts one embodiment of a second update boundary conditions process (along the interface region for the viscous domain solve) for the computational fluid dynamics modeling approach of FIG. 4, in accordance with one or more aspects of the present invention.

FIG. 12 depicts one embodiment of a second update of boundary conditions, wherein boundary conditions are initially set, except along the interface regions for the viscous domain solve 1200. Boundary conditions are then set along the interface regions for the viscous domain solve using the results from the inviscid domain solve at time step (n−1) 1205, and the solution for the next iteration of the viscous domain solve is initialized using the results from the previous time step (n−1) viscous domain solve 1210.

As shown in FIG. 4, multiple iterations through the viscous domain solve, first update boundary conditions, inviscid domain solve, increment time step (n), and second update boundary conditions, occur until (in this example) time step (n) has reached the maximum defined time step ($n_{max}$). Depending upon the implementation, time step ($n_{max}$) might be any set number of iterations, for example, 10, 100 or 1,000, etc. iterations. Once time step (n) has reached the maximum defined time step ($n_{max}$), then it is assumed that the results for the viscous domain solve and the inviscid domain solve have each obtained convergence, and the results of the two solves are provided as the solution 450, which completes the computational fluid dynamics modeling of the bounded domain 455.

Numerous variations or enhancements to the above-described modeling process are possible. For example, while iterating through the viscous domain solve and inviscid domain solve until time step (n) has reached the maximum defined time step ($n_{max}$), the bounded domain could be re-divided into a different viscous region(s) and a different inviscid region(s), after which the viscous domain solve may be performed for the different viscous region(s) using the turbulence model, and the inviscid domain solve may be performed for the different inviscid region(s) using the set of inviscid equations.

Figure 13:
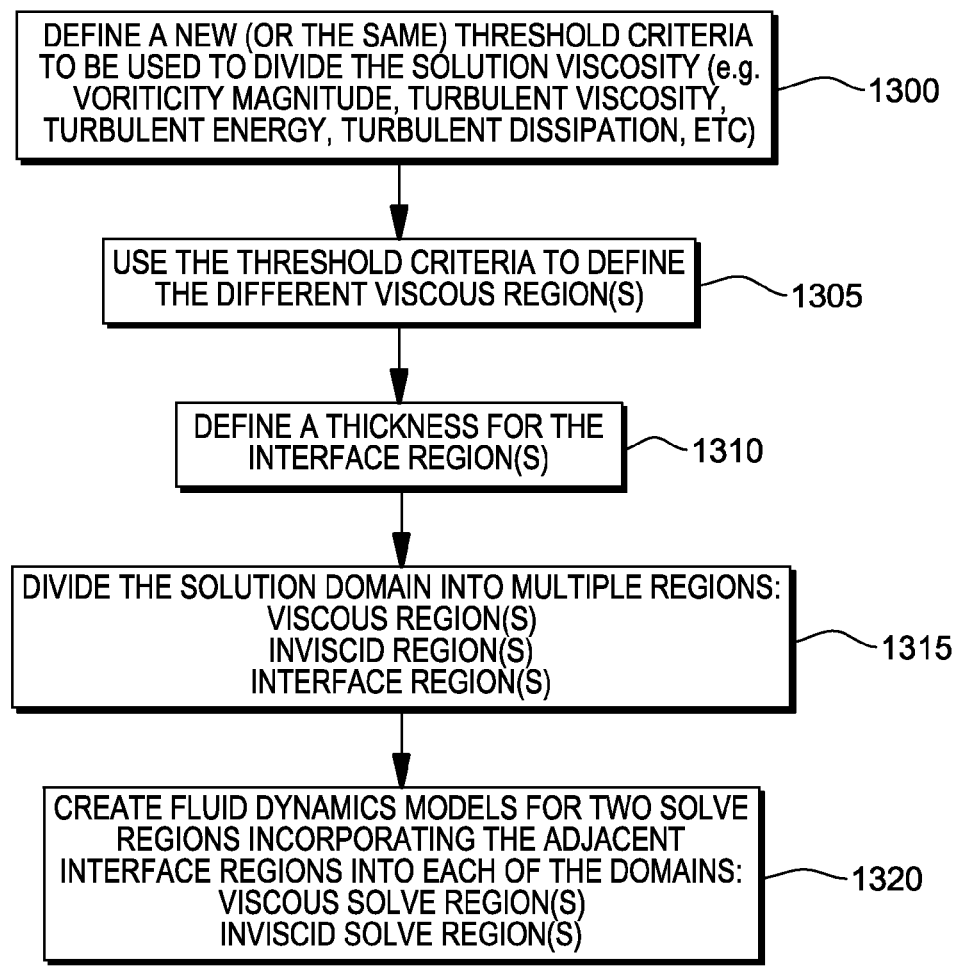
FIG. 13 depicts one embodiment of an optional process for adapting the viscous region(s), inviscid region(s) and interface region(s) in the solution domain of the computational fluid dynamics modeling approach of FIG. 4, in accordance with one or more aspects of the present invention.

One example of such a process is depicted in FIG. 13. Re-dividing the bounded domain can include defining a new (or the same) threshold criteria to be used in dividing the solution domain 1300. As described above, the threshold criteria is (in one example) a set threshold for a turbulence characteristic associated with the cells of one of the multi-grid meshes, and may comprise a vorticity magnitude, a turbulent kinetic energy characteristic, a turbulent dissipation characteristic, etc. The threshold criteria is then used to define one or more different viscous regions 1305. A thickness of the interface region is defined 1310, and the solution domain is divided into multiple regions, that is, one or more viscous regions, one or more inviscid regions, and one or more interface regions 1315. The fluid dynamic models for the different solve regions are created incorporating the adjacent interface regions into each of the solve domains to arrive at a viscous solve region(s) and an inviscid solve region(s) 1320.

As another option, the one or more grids employed in the viscous domain solve and the one or more grids employed in the inviscid domain solve may be dynamically adapted between iterations through the viscous domain solve and inviscid domain solve by, for example, increasing grid density where desired, and removing grid density where not needed based on, for example, velocity or temperature magnitudes or velocity or temperature gradients.

Figure 14:
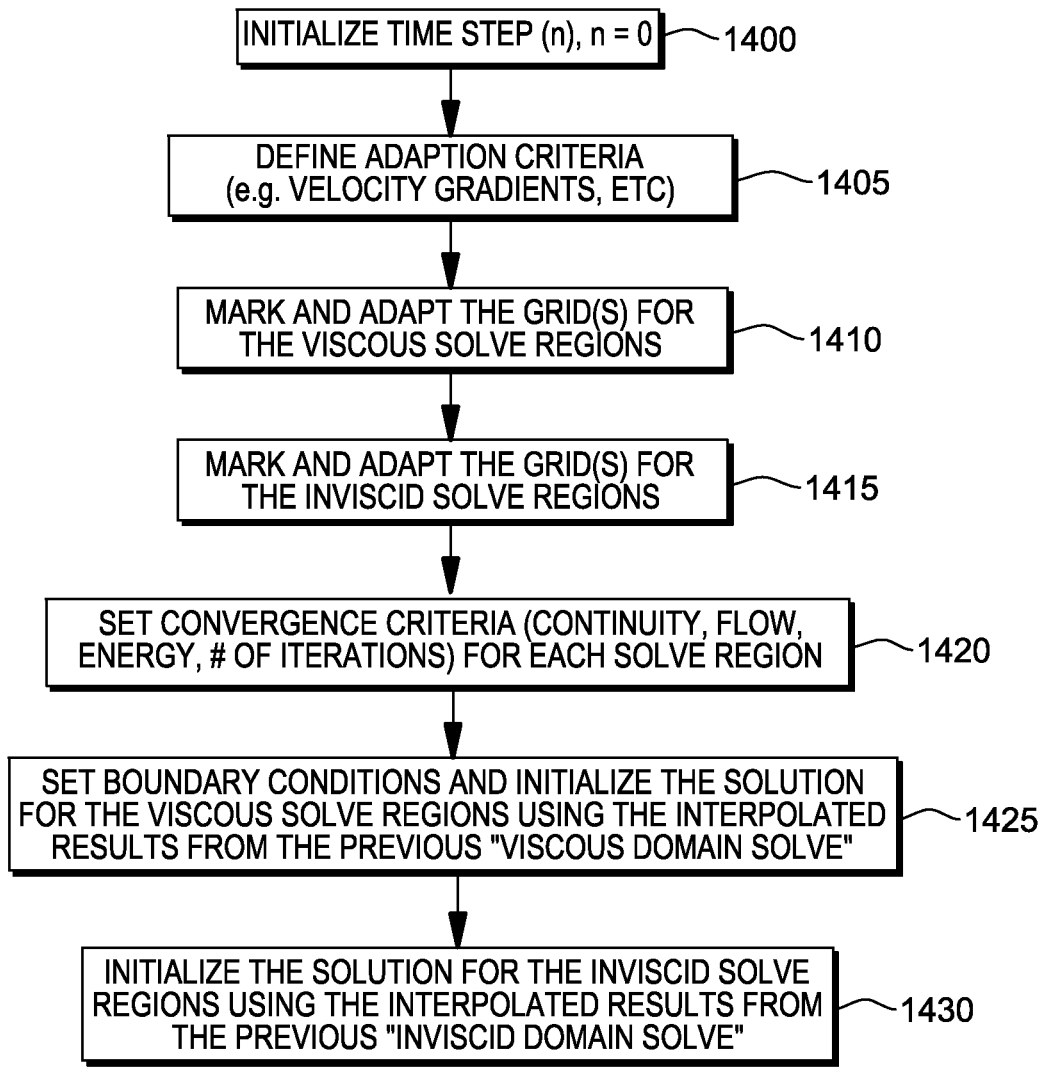
FIG. 14 depicts one embodiment of an optional process for adapting one or more grids employed in the viscous domain solve or inviscid domain solve processing of the computational fluid dynamics modeling approach of FIG. 4, in accordance with one or more aspects of the present invention.

FIG. 14 depicts one embodiment of a process for adapting the grid(s). This processing includes initialing time step (n) to zero 1400, and defining an adaption criteria, such as a velocity gradient, temperature gradient, velocity magnitude, or temperature magnitude, etc. 1405. Once the adaption criteria is met, one or more grids for the viscous solve region(s) are adapted 1410, and/or one or more grids for the inviscid solve region(s) are adapted 1415. The convergence criteria for each solve region is set 1420, as well as the boundary conditions, and the solution for the viscous solve region(s) is initialized using the interpolated results from the previous viscous domain solve 1425 (which is assumed to have used a different grid). Similarly, the solution for the inviscid solve region(s) is initialized using interpolated results from the previous inviscid domain solve 1430.

Additional variations on the computational fluid dynamics modeling processes disclosed herein may include changing the number of iterations before incrementing the time step, potentially running multiple viscous/inviscid loops for higher accuracy, and/or using more stringent convergence criteria for subsequent iterations. In the case of transient boundary conditions, the model's boundary conditions could be changed at various time steps during the processing. The energy equation (noted above) can be run from the beginning and for every iteration (slowest approach, but accurate), or only after a certain number of iterations (slightly faster), or only after the flow solution is converged (fasted, but least accurate), or only at certain iterations, keeping the temperature field fixed between updates (fast and accurate). The above-described method assumes a non-conformal grid at the interface regions. Alternatively, a conformal grid could be employed, which could increase computational speed during boundary condition updates, but may significantly slow inviscid domain solve speed, or decrease viscous domain accuracy.

Further variations might include providing different multi-grid method parameters. That is, the chosen multi-grid method and parameters could be changed for each of the solution steps. The interface regions could be dynamically adjusted based, for example, on vorticity magnitude for new grid solutions. The criteria for selecting regions could be changed. Other criteria could be used besides voracity magnitude, as described above. A conservative criteria could significantly increase the solve time, but a too-aggressive criteria would decrease solution accuracy. As noted above, different turbulence models could be employed for different viscous regions of the bounded domain. Certain viscous regions may be more accurately modeled with different turbulence models, and subsequently, multiple turbulence models could be used for the different viscous regions. The viscous regions could be specified a priori by defining regions for certain turbulence models before beginning the computation; or in situ, by either defining parameters in which to select the turbulence model based on the flow conditions, or placing an additional step in the processing flow, after dividing the solution domain, for the user to define each viscous region's turbulence model. In addition, the initial solve with the inviscid equations could be omitted, with the initial solve going straight to the second solve described above, which employs one or more turbulence models.

Those skilled in the art will note that, presented herein is a method of solving a computational fluid dynamics (CFD) model of a bounded domain, such as a data center, which includes using inviscid equations with a coarse multi-grid. Once convergence is reached, using the same grids, the model can be re-solved with a basic turbulence model, with the previously-obtained inviscid solution being employed as the initial solution to the second solve. Subsequent to the second solve, the model's domain is divided into multiple regions based on a threshold criteria of a turbulence characteristic at, for example, the finest grid level. One or more viscous regions are defined by combining adjacent cells with (for example) turbulence characteristic magnitudes greater than the threshold criteria. A new, fine multi-grid is created for each of these viscous solve regions. Similarly, inviscid regions are defined by combining adjacent cells with turbulence characteristics less than the threshold criteria, and a new medium multi-grid is created for each of these inviscid solve regions. Interface regions are defined as overlap regions that include (in one example) one level deep of each of the new grids (i.e., the viscous and inviscid grids) located at the boundaries between the viscous regions and the inviscid regions. The interface regions are used to pass boundary conditions back and forth between the two solvers.

Processing initializes the time step counter to zero, and performs a next solve for the CFD model over the viscous domain using the desired turbulence model and using the previous coarse grid, basic turbulence model solution as an initial solution. A multi-grid method is employed to speed convergence. The boundary conditions from the interface regions are employed with the solution from the coarse grid, basic turbulence model.

Once the model has converged, the boundary conditions are updated across the interface regions on the new, finer grid. Next, the CFD model is solved over the inviscid domain using a multi-grid method and the previously-defined, medium multi-grid mesh, with the basic turbulence model solution as an initial solution. The boundary conditions for the interface regions that were just updated from the viscous solve regions are employed in the inviscid domain solve. After convergence, the time step is evaluated to determine whether a maximum time step has been reached, and if so, the results of the viscous and inviscid domain solves are assembled to provide a bounded domain model. If not, then the time step (n) is incremented, and processing continues for another iteration. Each subsequent iteration includes, in one example, four steps before checking the counter again, and either ending the routine or incrementing the counter. The first step is to update the boundary conditions across the interface regions from the previous solution to the inviscid domain solve. Next, the viscous domain solve occurs for the new time step using the new, updated boundary conditions and the previous time step solution to the viscous domain solve as the initial solution. Once completed, the same two operations are applied to the interface regions from the viscous solver, and a new time step inviscid domain solve is performed in a similar manner to the viscous domain solve.

Advantageously, the method disclosed herein reduces solve time compared to a viscous-only solve of a CFD model. Further, the hybrid method increases accuracy compared to inviscid-only solves. The method provides a potential trade-off between overall solution accuracy and solve time, dependent upon, for example, the turbulence characteristic criterion selected. Numerous alternative embodiments are possible to further improve accuracy and/or reduce solve time over static models. These include multiple solving loops, tightening of convergence criteria, judicious use of the energy equation, adaptive and non-conformal grids, different multi-grid method parameters, dynamic interface regions, and the use of multiple turbulence models in association with multiple viscous regions. The method could be employed to solve particular regions of interest with high accuracy, while significantly reducing the overall computational time. Transient solutions can realistically be explored in a timely manner.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 15:
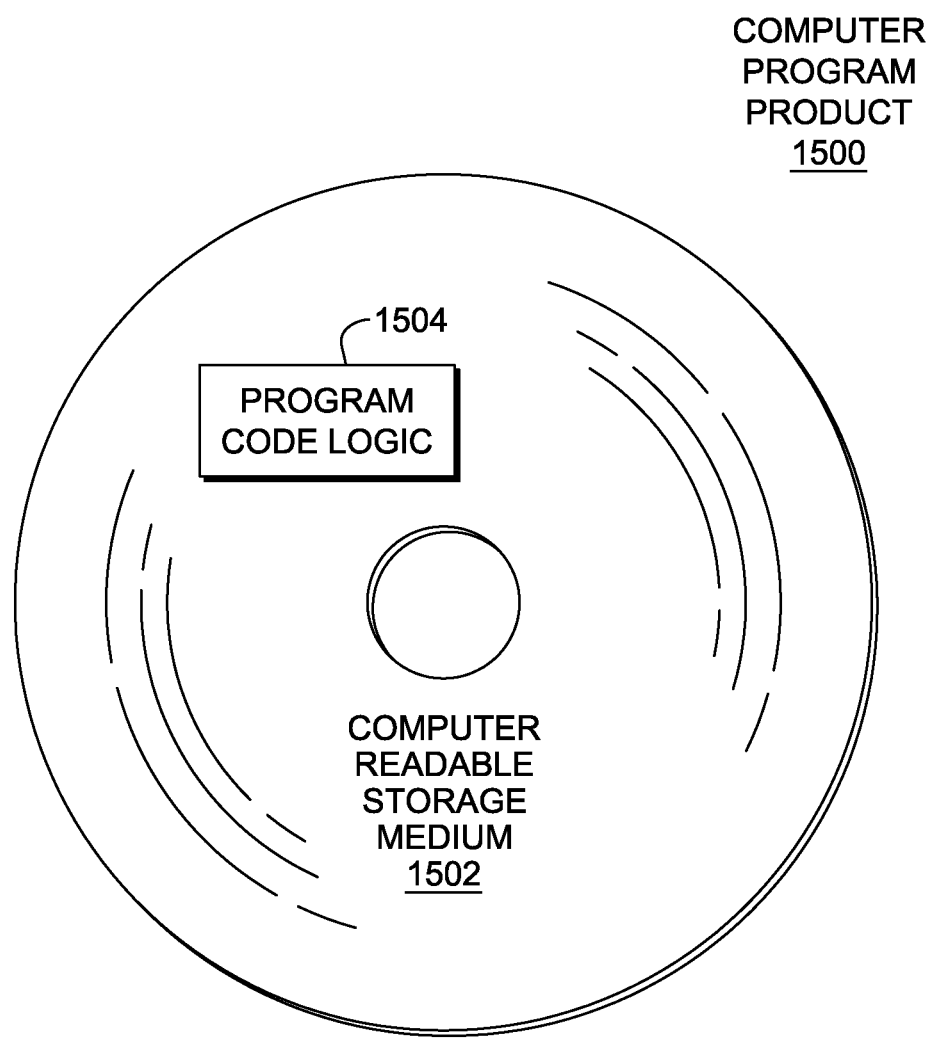
FIG. 15 depicts one embodiment of a computer program product incorporating one or more aspects of the present invention.

Referring now to FIG. 15, in one example, a computer program product 1500 includes, for instance, one or more computer readable storage media 1502 to store computer readable program code means or logic 1504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments illustrated were chosen and described in order to explain the principles of the invention and the practical application, and to enable others of ordinary skill in the art to understand the invention for various embodiment with various modifications as are suited to the particular use contemplated.

What is claimed is:

1. A method comprising:
  performing computational fluid dynamics modeling of a bounded domain, the bounded domain comprising a data center, the performing comprising:
    processing the bounded domain to automatically locate and separate within the bounded domain at least one viscous region and at least one inviscid region of the bounded domain using a turbulence characteristic threshold criterion to divide the bounded domain into the at least one viscous region and the at least one inviscid region;
    separately evaluating the at least one viscous region and the at least one inviscid region by:
      performing viscous domain solve for the at least one viscous region within the bounded domain using at least one turbulence model;
      performing inviscid domain solve for the at least one inviscid region within the bounded domain using a set of inviscid equations; and providing results of the viscous domain solve and the inviscid domain solve as an internal model of the bounded domain.

2. The method of claim 1, wherein the processing comprises separating the bounded domain into the at least one viscous region and the at least one inviscid region using at least one grid of the bounded domain, the at least one grid comprising a plurality of cells, and for each cell of multiple cells of the at last one grid, the locating comprises determining whether a set threshold for a turbulence characteristic of that cell has been met, and responsive to the set threshold having been met, assigning the cell to the at least one viscous region, otherwise assigning the cell to the at least one inviscid region.

3. The method of claim 2, wherein the turbulence characteristic comprises at least one of a vorticity magnitude characteristic for the cell, a turbulent viscosity characteristic for the cell, a turbulent kinetic energy characteristic for the cell, or a turbulent dissipation characteristic for the cell.

4. The method of claim 1, wherein the performing viscous domain solve comprises performing multiple iterations of viscous domain solve, and the performing inviscid domain solve comprises performing multiple iterations of inviscid domain solve, and wherein the method further comprises, after each iteration of the multiple iterations of the viscous domain solve, and each iteration of the multiple iterations of the inviscid domain solve, determining whether to update boundary conditions between the at least one viscous region and the at least one inviscid region.

5. The method of claim 1, wherein the processing further comprises identifying at least one interface region within the bounded domain between the at least one viscous region and the at least one inviscid region.

6. The method of claim 5, wherein performing the viscous domain solve comprises performing multiple iterations of viscous domain solve for the at least one viscous region and the at least one interface region using the at least one turbulence model, and wherein performing the inviscid domain solve comprises performing multiple iterations of inviscid domain solve for the at least one inviscid region and the at least one interface region using the set of inviscid equations.

7. The method of claim 6, wherein the viscous domain solve and the inviscid domain solve are subject to different boundary conditions, the boundary conditions for the viscous domain solve comprising boundary conditions at a boundary of the at least one inviscid region and at least one interface region, and the boundary conditions for the inviscid domain solve comprising boundary conditions at a boundary of the at least one interface region and the at least one viscous region.

8. The method of claim 6, wherein performing the viscous domain solve using at least one turbulence model comprises performing the viscous domain solve for the at least one viscous region using full Navier-Stokes equations with at least one turbulence equation and using a multi-grid analysis.

9. The method of claim 8, further comprising setting boundary conditions along the at least one interface region for the inviscid domain solve using results from the viscous domain solve.

10. The method of claim 9, wherein, performing the inviscid domain solve further comprise initializing, where a time step through the computational fluid dynamics modeling is other than zero, a solution for the inviscid domain solve using results from a previous time step (n−1) through the inviscid domain solve.

11. The method of claim 9, wherein performing the inviscid domain solve for the at least one inviscid region comprises performing the inviscid domain solve for the at least one inviscid region using the set of inviscid equations and using a multi-grid analysis.

12. The method of claim 11, farther comprising incrementing as time step (n) iteration through the computational fluid dynamics modeling, and setting for time step (n) boundary conditions along the at least one interface region for the viscous domain solve using results from the inviscid domain solve at time step (n−1).

13. The method of claim 12, wherein performing the viscous domain solve further comprises initializing, where the time step (n) through the computational fluid dynamics modeling is other than zero, a solution for the viscous domain solve using results from a previous time step (n−1) through the viscous domain solve.

14. The method of claim 12, further comprising repeating performing the viscous domain solve, the setting boundary conditions along the at least one interface region for the inviscid domain solve, the performing the inviscid domain solve, the incrementing the time step (n), and the setting boundary conditions along the at least one interface region for the viscous domain solve, until the time step (n) reaches a set convergence threshold time step (n) for the computational fluid dynamics modeling of the bounded domain.

15. The method of claim 1, further comprising, prior to the processing, building a solution domain as an initial computational fluid dynamics model of the bounded domain, defining boundary conditions for the solution domain, creating at least one coarse grid of the solution domain, and first solving the solution domain using the at least one coarse grid and the set of inviscid equations.

16. The method of claim 15, further comprising, prior to the processing, reusing the solution domain from the first solving, the boundary conditions for the solution domain, and the at least one coarse grid, and second solving the solution domain using the at least one coarse grid, and using the at least one turbulence model to ascertain a turbulence characteristic for each cell of a plurality of cells of the at least one coarse grid.

17. The method of claim 16, wherein the first solving the initial computational fluid dynamics model using the at least one coarse grid and the set of inviscid equations comprises initializing a first solution for the solution domain, and the second solving of the initial computational fluid dynamics model using the at least one coarse grid and the turbulence model comprises initialing a second solution for the solution domain with results from the first solving.

18. The method of claim 1, further comprising repeating performing the viscous domain solve and performing the inviscid domain solve for multiple iterations, and wherein the method further comprises, during the repeating, relocating the bounded domain into a different at least one viscous region and a different at least one inviscid region and, subsequent to the re-dividing, performing the viscous domain solve for the different at least one viscous region using the turbulence model and performing the inviscid domain solve for the different at least one inviscid region using the set of inviscid equations.

19. The method of claim 1, wherein performing the viscous domain solve uses at least one first grid and the performing the inviscid domain solve uses at least one second grid, and wherein the method further comprises repeating the performing the viscous domain solve and the performing the inviscid domain solve, and during the repeating, dynamically adapting the at least one first grid for the viscous domain solve or the at least one second grid for the inviscid domain solve.

20. The method of claim 1, wherein performing the viscous domain solve uses at least one fine grid and performing the inviscid domain solve uses at least one medium grid, the at least one medium grid being coarser than the at least one fine grid.

* * * * *